(12) United States Patent
Takahashi

(10) Patent No.: US 11,206,530 B2
(45) Date of Patent: Dec. 21, 2021

(54) COMMUNICATION DEVICE AND PAIRING METHOD

(71) Applicant: SONY CORPORATION, Tokyo (JP)

(72) Inventor: Satoshi Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/476,352

(22) PCT Filed: Dec. 6, 2017

(86) PCT No.: PCT/JP2017/043820
§ 371 (c)(1),
(2) Date: Jul. 8, 2019

(87) PCT Pub. No.: WO2018/135165
PCT Pub. Date: Jul. 26, 2018

(65) Prior Publication Data
US 2020/0008048 A1    Jan. 2, 2020

(30) Foreign Application Priority Data

Jan. 17, 2017   (JP) ................................ 2017-005622

(51) Int. Cl.
*H04W 8/24* (2009.01)
*H04W 4/08* (2009.01)
(Continued)

(52) U.S. Cl.
CPC ............... *H04W 8/24* (2013.01); *H04W 4/08* (2013.01); *H04W 8/005* (2013.01); *H04W 84/10* (2013.01); *H04W 84/20* (2013.01)

(58) Field of Classification Search
CPC ......... H04W 8/24; H04W 4/08; H04W 8/005; H04W 84/10; H04W 84/20; H04W 4/023; H04W 4/80; H04W 76/10; H04W 84/18
See application file for complete search history.

(56) References Cited

U.S. PATENT DOCUMENTS 7,844,295 B1 * 11/2010 Ngan .................. H04M 1/7253
455/552.1
8,795,138 B1    8/2014 Yeh et al.
(Continued)

FOREIGN PATENT DOCUMENTS

CN          101006690 A      7/2007
CN          102255896 A     11/2011
(Continued)

OTHER PUBLICATIONS

International Search Report and Written Opinion of PCT Application No. PCT/JP2017/043820, dated Jan. 16, 2018, 10 pages of ISRWO.

(Continued)

*Primary Examiner* — Magdi Elhag
(74) *Attorney, Agent, or Firm* — Chip Law Group

(57) ABSTRACT

To enable quick execution of pairing among devices with saving user's effort when grouping three or more communication devices. Group list information indicating a device selected as a device capable of wireless communication and as a device capable of corresponding to a group that performs communication is generated or acquired. For example, a master device generates the group list information and a slave device receives and acquires the group list information. Then, pairing processing of setting a own device and a communication device indicated in the group list information to be wireless communication targets to each other is performed by reference to the group list information.

13 Claims, 12 Drawing Sheets

(51) Int. Cl.
H04W 8/00 (2009.01)
H04W 84/10 (2009.01)
H04W 84/20 (2009.01)

(56) References Cited

U.S. PATENT DOCUMENTS

| | | | |
|---|---|---|---|
| 8,909,146 B2 * | 12/2014 | Kim | H04L 67/16 455/41.2 |
| 9,131,478 B2 | 9/2015 | Dharawat | |
| 9,906,924 B2 * | 2/2018 | Azmat | H04W 4/08 |
| 10,306,687 B2 * | 5/2019 | Folske | H04W 4/023 |
| 2005/0276231 A1 | 12/2005 | Ayyagari | |
| 2007/0274270 A1 * | 11/2007 | Jones | H04W 84/18 370/338 |
| 2008/0165024 A1 * | 7/2008 | Gretton | G01C 21/3655 340/4.31 |
| 2010/0035549 A1 | 2/2010 | Fujii | |
| 2010/0262696 A1 * | 10/2010 | Oshiba | H04M 1/7253 709/227 |
| 2011/0314153 A1 | 12/2011 | Bathiche et al. | |
| 2013/0170482 A1 * | 7/2013 | Jung | H04W 8/005 370/338 |
| 2014/0094124 A1 * | 4/2014 | Dave | H04W 12/50 455/41.2 |
| 2014/0274173 A1 | 9/2014 | Dharawat | |
| 2014/0375428 A1 * | 12/2014 | Park | G06K 7/10237 340/10.1 |
| 2015/0074182 A1 | 3/2015 | Jung et al. | |
| 2016/0278137 A1 | 9/2016 | Oguchi | |
| 2016/0294999 A1 | 10/2016 | Glezerman et al. | |
| 2017/0093079 A1 | 3/2017 | Wagman et al. | |
| 2018/0049013 A1 * | 2/2018 | Lee | H04W 76/14 |
| 2018/0180648 A1 * | 6/2018 | Carson | G08B 5/36 |
| 2018/0249518 A1 * | 8/2018 | Nguyen | H04W 4/10 |
| 2019/0089790 A1 | 3/2019 | Bathiche et al. | |

FOREIGN PATENT DOCUMENTS

| | | |
|---|---|---|
| CN | 104436615 A | 3/2015 |
| CN | 105723796 A | 6/2016 |
| CN | 105766003 A | 7/2016 |
| CN | 106551494 A | 4/2017 |
| EP | 1757048 A1 | 2/2007 |
| EP | 3020253 A1 | 5/2016 |
| EP | 3033919 A1 | 6/2016 |
| EP | 3063958 A1 | 9/2016 |
| EP | 3151582 A1 | 4/2017 |
| JP | 2006-229360 A | 8/2006 |
| JP | 2008-503161 A | 1/2008 |
| JP | 2014-167694 A | 9/2014 |
| JP | 2015-061318 A | 3/2015 |
| JP | 2015-149596 A | 8/2015 |
| JP | 2016-178357 A | 10/2016 |
| JP | 2017-500827 A | 1/2017 |
| JP | 2017-108606 A | 6/2017 |
| KR | 10-2015-0030560 A | 3/2015 |
| KR | 10-2017-0039568 A | 4/2017 |
| WO | 2005/125129 A1 | 12/2005 |
| WO | 2006/088016 A1 | 8/2006 |
| WO | 2014/163781 A1 | 10/2014 |
| WO | 2015/037944 A1 | 3/2015 |
| WO | 2015/041970 A1 | 3/2015 |
| WO | 2015/063771 A1 | 5/2015 |
| WO | 2017/058675 A2 | 4/2017 |

OTHER PUBLICATIONS

Daisuke Arai, "M2M Management Scheme for the Complexity of the Device Configuration", The Journal of the Institute of Electronics, Information and Communication Engineers, vol. 4, No. 4, Apr. 2016, pp. 283-296.

Extended European Search Report of EP Application No. 17892200.1, dated Nov. 27, 2019, 14 pages.

"Master Table of Content and Compliance Requirements", Bluetooth Core Specification Version 5 0, vol. 0, XP055499587, Dec. 6, 2016, 1300 pages.

* cited by examiner

RR

| | GROUP LIST |
|---|---|
| FIRST LINE | BD_ADDR OF COMMUNICATION DEVICE 1A |
| SECOND LINE | BD_ADDR OF COMMUNICATION DEVICE 1B |
| THIRD LINE | BD_ADDR OF COMMUNICATION DEVICE 1C |
| FOURTH LINE | BD_ADDR OF COMMUNICATION DEVICE 1D |

COMMUNICATION DEVICE AND PAIRING METHOD

CROSS REFERENCE TO RELATED APPLICATIONS

This application is a U.S. National Phase of International Patent Application No. PCT/JP2017/043820 filed on Dec. 6, 2017, which claims priority benefit of Japanese Patent Application No. JP 2017-005622 filed in the Japan Patent Office on Jan. 17, 2017. Each of the above-referenced applications is hereby incorporated herein by reference in its entirety.

TECHNICAL FIELD

The present technology relates to a communication device, a pairing method, and a program, and particularly relates to a pairing technology in communication among a large number of such as three or more devices.

BACKGROUND ART

Bluetooth (registered trademark) wireless technology is peer to peer (P2P) communication and requires pairing between devices in advance to perform communication between the devices. Because of the P2P communication, normally, one-to-one pairing is performed in one operation.

For example, in a case where there are a smartphone, a headset, a speaker, a personal computer, or the like, pairing is performed in a desired combination.

Patent Document below describes a technology regarding pairing.

A user procedure for pairing is, for example, as follows.

For example, in a case where the user wants to listen to music played on a smartphone using a wireless headset, the user performs an operation to turn on Bluetooth communication on the smartphone. Then, the smartphone searches for nearby communicable devices and displays the discovered communicable devices.

The user performs an operation to specify a headset to be used among the displayed communicable devices. Then, the smartphone performs pairing with the headset.

Thereby, the smartphone and the headset are set to be communication targets with each other, and the user becomes able to listen to the music played on the smartphone using the wirelessly connected headset thereafter.

CITATION LIST

Patent Document

Patent Document 1: Japanese Patent No. 4618279

SUMMARY OF THE INVENTION

Problems to be Solved by the Invention

By the way, communication devices that enable a talk in a group of a plurality of people who are in a short distance are useful. For example, nearby friends can talk with one another by using Bluetooth communication devices mounted on helmets used for motorcycles, skiing, or the like.

In this case, a plurality of friends such as three or four people, for example, is only required to pair their communication devices with communication devices of other people in advance.

However, one pairing operation is performed on a one-to-one basis for each two devices as each combination. For this reason, in a case where the devices are connected in the group, the number of times of pairing increases as the number of connected devices increases.

For example, in a case where pairing is performed among N connected devices in a round-robin manner, $N*(N-1)/2$ times of pairing is required. In a case where four friends respectively carry out devices A, B, C, and D, and perform communication, six times of pairing operations between A and B, A and C, A and D, B and C, B and D, and C and D are required.

Furthermore, the users need to perform the pairing operations while grasping which devices are paired and which devices are unpaired.

Therefore, pairing becomes very troublesome for the users as the number of connected devices increases.

Of course, in a case of adding or deleting a connected device or changing the connection mode, re-pairing is required each time and pairing becomes very complicated and troublesome.

Therefore, an object of the present technology is to facilitate a pairing operation in a case where, for example, pairing is performed among three or more devices to create a communicable group.

Solutions to Problems

A communication device according to the present technology includes a list information processing unit configured to generate or acquire group list information indicating a device selected as a device capable of wireless communication and as a device capable of corresponding to a group that performs communication, and a pairing processing unit configured to perform pairing processing of setting the own device and a communication device indicated in the group list information to be wireless communication targets to each other by reference to the group list information.

For example, the communication device performs pairing with devices listed in the group list information indicating three or more communication devices including the own communication device.

In the communication device according to the above-described present technology, it is conceivable that the list information processing unit selects two or more devices to be connected capable of corresponding to a group that performs communication on the basis of predetermined information from among the devices capable of wireless communication in response to a grouping start trigger, and generates the group list information indicating the own device and the two or more devices to be connected.

In other words, the communication device creates the group list information as an operation as a communication device serving as a master in grouping.

In the communication device according to the above-described present technology, it is conceivable that the list information processing unit selects the devices to be connected, using device type information received from another device capable of wireless communication as the predetermined information.

That is, the communication device that becomes the master in grouping selects the device to be connected from among peripheral devices capable of wireless communication according to the device type.

In the communication device according to the above-described present technology, it is conceivable that the list information processing unit generates the group list information indicating device identification information of the selected devices to be connected in descending order from a device having a high received signal strength indicator.

The communication device serving as a master in grouping creates the group list information indicating devices in a list in order from devices capable of more reliably performing communication in order.

In the communication device according to the above-described present technology, it is conceivable that the list information processing unit generates the group list information indicating devices within an upper limit number set including the own device.

That is, the communication device serving as a master in grouping creates the group list information limiting the number of devices to within the upper limit number.

In the communication device according to the above-described present technology, it is conceivable that the pairing processing unit performs the pairing processing with each of the devices to be connected indicated in the group list information.

In other words, the communication device serving as a master in grouping sequentially executes the pairing processing with each of the devices to be connected indicated in the group list information on the basis of the created group list information.

In the communication device according to the above-described present technology, it is conceivable that the pairing processing unit performs transmission control of the group list information to all or part of the devices to be connected indicated in the group list information.

For example, the communication device serving as a master in grouping is not only paired with each of the devices to be connected indicated in the group list information but also provides the generated group list information to each of the devices on the basis of the created group list information.

In the communication device according to the above-described present technology, it is conceivable that the pairing processing unit performs transmission control of a pairing execution instruction using the group list information to a transmission destination device of the group list information.

The communication device serving as a master in grouping causes the slave devices to perform pairing using the distributed group list information.

In the communication device according to the above-described present technology, it is conceivable that the list information processing unit acquires the group list information by receiving the group list information transmitted from a paired device.

In other words, the communication device serving as a slave in grouping acquires the group list information by receiving the group list information from another device (for example, the master device).

In the communication device according to the above-described present technology, it is conceivable that the pairing processing unit transitions to a state of not responding to any pairing request other than a pairing request specifying the own device in response to reception of a first pairing request after start of grouping.

In other words, the communication device serving as a slave in grouping transitions to a state of performing the pairing processing with the device but not responding to an inquiry for searching for a communicable device when the pairing request is given from the master device or another slave device.

In the communication device according to the above-described present technology, it is conceivable that the pairing processing unit performs the pairing processing with an unpaired device among the devices indicated in the group list information in response to reception of a pairing execution instruction.

In other words, the communication device serving as the slave device in grouping confirms another slave device on the basis of the group list information, and is paired with the another slave device in response to the pairing execution instruction from the master device.

In the communication device according to the above-described present technology, it is conceivable that the pairing processing unit sends a pairing completion notification to a transmission source device of the pairing execution instruction when completing the pairing processing with all of unpaired devices among the devices indicated in the group list information.

In other words, the communication device serving as a slave in grouping notifies the master device of completion when the communication device becomes in a completed state of pairing with all the other slave devices.

In the communication device according to the above-described present technology, it is conceivable that a voice input unit, a voice output unit, and a codec unit configured to encode and decode a voice signal are further included, and the communication device performs communication of a call voice.

In other words, the communication device is used for a call of a conversational voice or the like.

A communication device pairing method according to the present technology includes a list information processing process of generating or acquire group list information indicating a device selected as a device capable of wireless communication and as a device capable of corresponding to a group that performs communication, and a pairing processing process of performing pairing processing of setting the own device and a communication device indicated in the group list information to be wireless communication targets to each other by reference to the group list information.

A program according to the present technology is a program that causes an arithmetic processing unit to execute processing of steps corresponding to the above-described list information processing process and pairing processing process.

Effects of the Invention

According to the present technology, pairing is automatically executed on the basis of group list information. Therefore, pairing among three or more devices can be quickly and efficiently executed, and the burden of operation on users is eliminated.

Note that effects described here are not necessarily limited, and any of effects described in the present disclosure may be exhibited.

MODE FOR CARRYING OUT THE INVENTION

Hereinafter, an embodiment will be described in the following order.
<1. Configuration of Communication Device>
<2. Grouping Operation>
<3. Processing Example of Communication Device>
<4. Conclusion and Modification>

1. Configuration of Communication Device

In an embodiment, a communication device 1 as a Bluetooth communication device is cited as an example. The communication device 1 is assumed to be a device capable of performing voice communication (call) with another paired communication device 1 in a state of being worn or carried by a user.

Figure 1A:
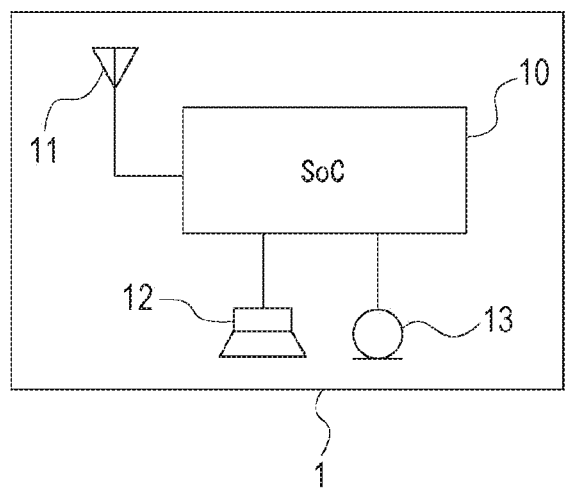
FIGS. 1A and 1B are block diagrams of a communication device according to an embodiment of the present technology.

FIG. 1A illustrates a configuration of the communication device 1 according to the embodiment.

The communication device 1 includes a system-on-a-chip (SoC) 10, an antenna 11, a speaker 12, and a microphone 13.

The SoC 10 is a Bluetooth SoC generated as a device for performing Bluetooth communication control.

Figure 1B:
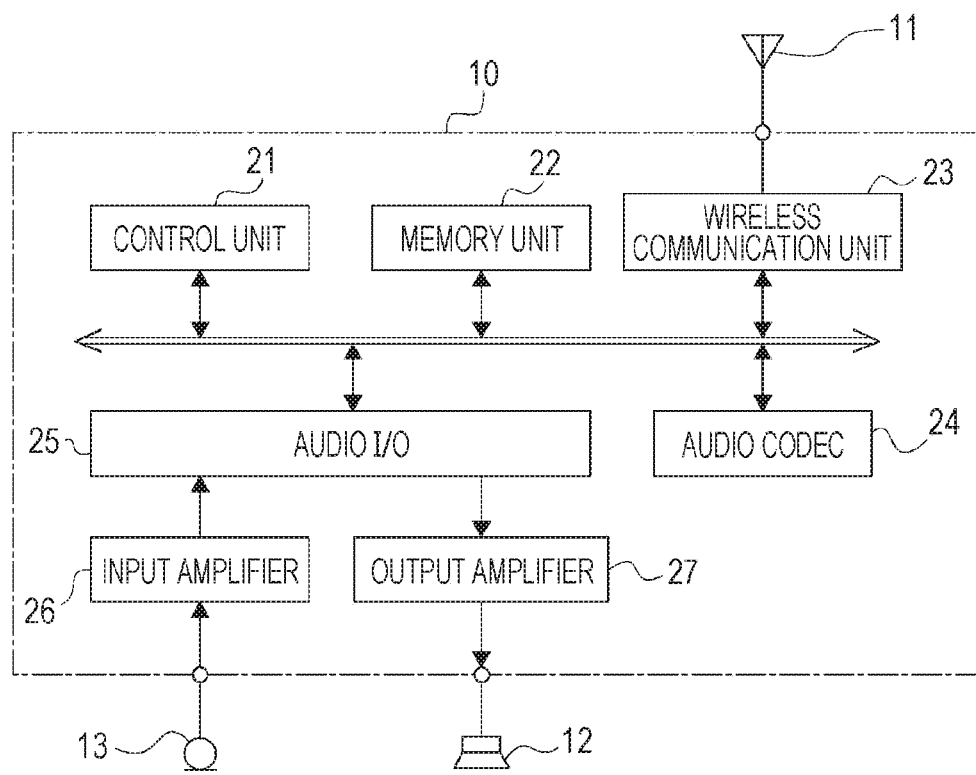

FIG. 1B illustrates an internal configuration example of the SoC 10. Note that, here, an example using an SoC is illustrated. However, the present embodiment is not limited to an SoC form, and it is sufficient that the communication device 1 has the configuration for performing Bluetooth communication control as illustrated in FIG. 1B.

The SoC 10 includes a control unit 21, a memory unit 22, a wireless communication unit 23, an audio codec 24, an audio interface 25, an input amplifier 26, and an output amplifier 27.

The control unit 21 is configured by a micro control unit (MCU), a digital signal processor (DSP), and the like, and controls an overall operation of the communication device 1.

Figure 2:
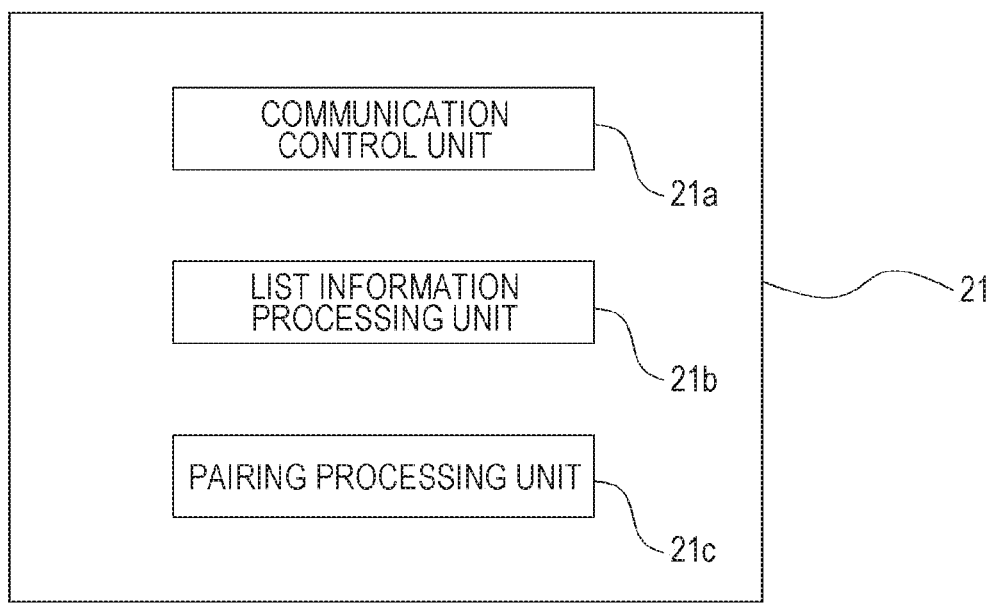
FIG. 2 is an explanatory diagram of a functional configuration of a control unit of the communication device according to the embodiment.

In the case of the present embodiment, the control unit 21 is provided with functions as a communication control unit 21a, a list information processing unit 21b, and a pairing processing unit 21c illustrated in FIG. 2 according to an operation program.

The communication control unit 21a is illustrated as a function to control an overall voice communication operation with another communication device 1 via the wireless communication unit 23.

In the present embodiment, in particular, the list information processing unit 21b and the pairing processing unit 21c are provided as functions to efficiently execute a grouping operation to perform pairing among three or more communication devices 1.

The list information processing unit 21b is a function to generate or acquire a group list indicating a device selected as a device capable of wireless communication and as a device capable of corresponding to a group that performs communication. The group list is information in which a own device, and devices selected as devices to be connected for a group call, among communicable devices existing in the neighborhood of the own device, are listed.

In a case where a certain communication device 1 serves as a master device in making a group capable of voice communication by pairing each two of three or more communication devices 1 each other, the certain communication device 1 performs processing of generating a group list by the function of the list information processing unit 21b.

Further, in the case of the communication device 1 as a slave device, the slave communication device 1 performs processing of receiving and acquiring a group list transmitted by another communication device 1 by the function of the list information processing unit 21b.

The pairing processing unit 21c is a function to perform pairing processing of setting a own device and a communication device indicated in the group list to be wireless communication targets to each other by reference to the group list information.

Although the procedure and contents of the pairing processing differ depending on whether the communication device 1 becomes a master device or a slave device, the necessary pairing processing is performed such that each communication device 1 in the group is paired with each of the other communication device 1.

Specific examples of the processing by the list information processing unit 21b and the pairing processing unit 21c will be described below.

The memory unit 22 in FIG. 1B generally indicates a read only memory (ROM), a random access memory (RAM), a flash ROM, and the like.

The ROM or the flash ROM in the memory unit 22 stores programs for realizing the functions illustrated in FIG. 2 and constants necessary for various types of processing, and the like.

The RAM in the memory unit 22 is used as an arithmetic area of various types of processing such as communication control, pairing processing, and group list generation and is also used for temporary data storage.

Information and a group list of pairing devices are stored in the RAM or the flash ROM.

The wireless communication unit 23 is illustrated as a unit that performs voice data communication according to a Bluetooth communication method via the antenna 11 on the basis of the control of the control unit 21.

The audio codec 24 performs encoding and decoding for the voice data communication. In other words, the audio codec 24 encodes voice data of a transmission voice obtained by the microphone 13 and supplies the voice data to the wireless communication unit 23. Furthermore, the audio codec 24 decodes voice data received by the wireless communication unit 23.

The microphone 13 collects the user's transmission voice. An analog voice signal collected by the microphone 13 is supplied to the input amplifier 26. The input amplifier 26 applies automatic gain control (AGC) processing, limiter processing, filter processing, conversion processing into a digital signal (A/D conversion), equalization, and the like to the analog voice signal, and supplies the voice signal to the audio interface 25 as digital data of the transmission voice. The digital data is transferred to the audio codec 24. Then, the digital data is encoded and transmitted from the wireless communication unit 23.

Voice data of reception voice received by the wireless communication unit 23 and decoded by the audio codec 24 is supplied to the output amplifier 27 via the audio interface 25. The output amplifier 27 supplies a voice signal, to which equalization, conversion processing into an analog signal (D/A conversion), level adjustment, power amplifier amplification, and the like has been applied, to the speaker 12 and causes the speaker 12 to execute a voice output.

Figure 3:
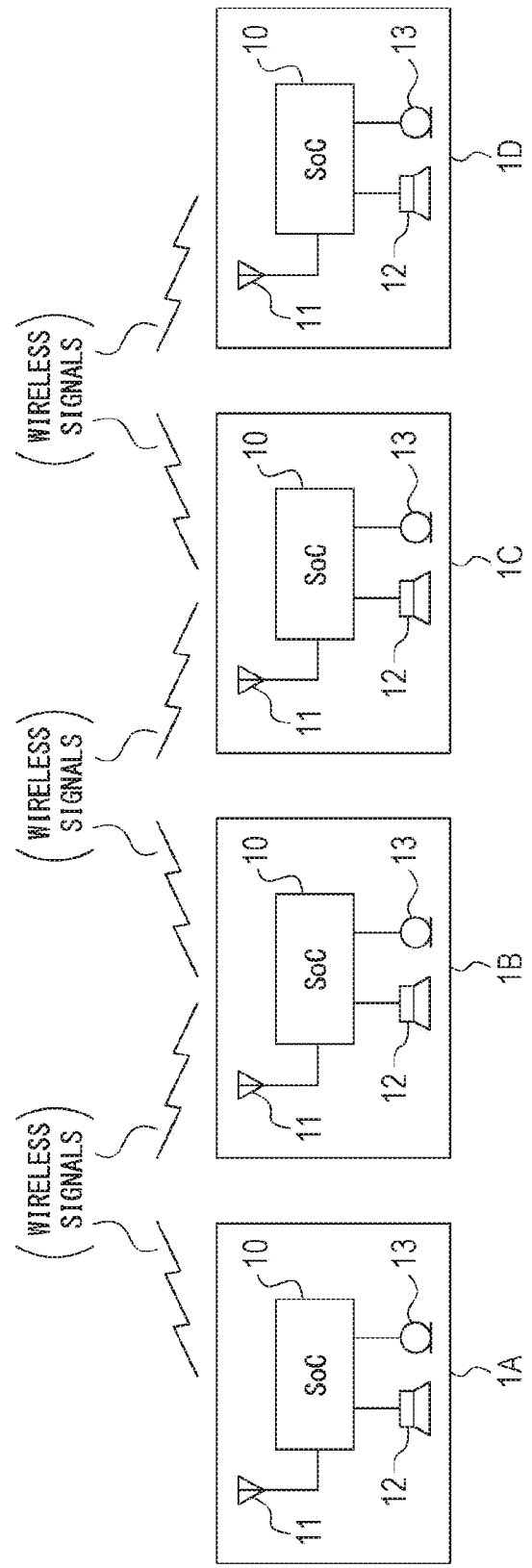
FIG. 3 is an explanatory diagram of communication among communication devices according to the embodiment.

FIG. 3 illustrates four communication devices 1A, 1B, 1C, and 1D as the communication devices 1 having such a configuration.

Since the communication devices 1A, 1B, 1C, and 1D are connected by a Bluetooth wireless method, users can have a voice conversation with each other, and moreover, all the users can have a conversation, even if the users are far away from one another, as long as wireless signals can reach.

To perform voice communication using a Bluetooth wireless technology, it is necessary to perform pairing among the communication devices 1A, 1B, 1C, and 1D in advance.

The present embodiment can facilitate such pairing among the communication devices 1A, 1B, 1C, and 1D, for example.

Figures 4A, 4B:
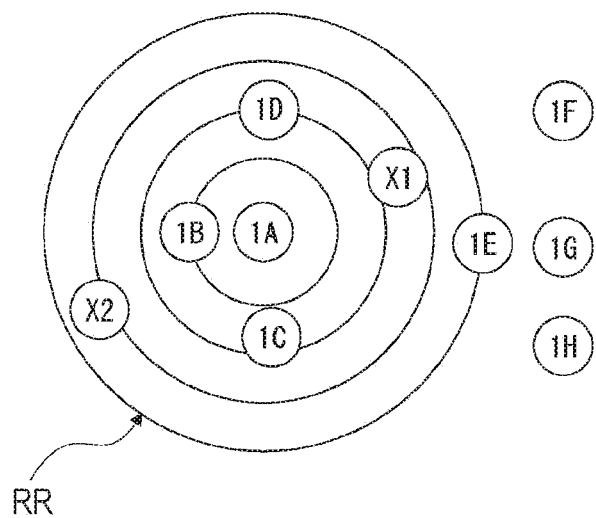
FIGS. 4A and 4B are explanatory diagrams of generation of a group list according to the embodiment.

FIG. 4A illustrates devices capable of Bluetooth communication existing in the neighborhood around the communication device 1A. Note that it is assumed that a circular range RR is a range in which an ID packet transmitted from the communication device 1A can reach.

Here, communication devices 1E, 1F, 1G, and 1H are also assumed to be similar communication devices 1 but are assumed to exist at relatively distant positions.

Devices X1 and X2 are also devices capable of Bluetooth communication but are not devices for voice communication with the communication devices 1. For example, the devices X1 and X2 are assumed to be devices such as music players or game devices. The devices X1 and X2 exist at positions where the devices X1 and X2 can communicate with the communication device 1A.

Here, assuming that four persons carrying the communication devices 1A, 1B, 1C, and 1D want to make a wireless call in a group.

The communication devices 1E, 1F, 1G, and 1H are assumed to be the communication devices 1 carried by unrelated persons.

Now, in a case where the communication device 1A serves as a master and performs grouping, the communication device 1A searches for devices capable of Bluetooth communication, thereby detecting the communication devices 1B, 1C, and 1D, and the devices X1 and X2. The communication device 1E may be detected.

The communication device 1A selects a device to belong to the group from among the devices detected as communicable devices.

In this case, the communication device 1A can eliminate the devices X1 and X2 from the devices to be connected by confirming device type information of each of the detected devices.

Furthermore, even in a case where the communication device 1E is detected, the received signal strength indicator is extremely weak. The communication device 1E can be eliminated from the device to be connected by lowering priority of selection of the communication device 1E according to the above characteristic. In a processing example described below, the communication device 1E is eliminated from the device to be connected due to number limitation.

Note that whether or not the communication device 1E is the device to be connected may be determined according to the level of the received signal strength indicator.

As described above, the communication device 1A selects devices in a group and generates a group list listing the devices to belong to the group.

An example of the group list is illustrated in FIG. 4B.

In the first line of the group list, the own device (communication device 1A) is described.

In the second and subsequent lines, the communication device 1B, the communication device 1C, and the communication device 1D selected as the devices in the group are described. Each of the communication devices 1A, 1B, 1C, and 1D is indicated by a Bluetooth device address (BD_ADDR).

Thus, the group list is generated at the time of grouping as indicating all the devices in the group.

2. Grouping Operation

Figure 5:
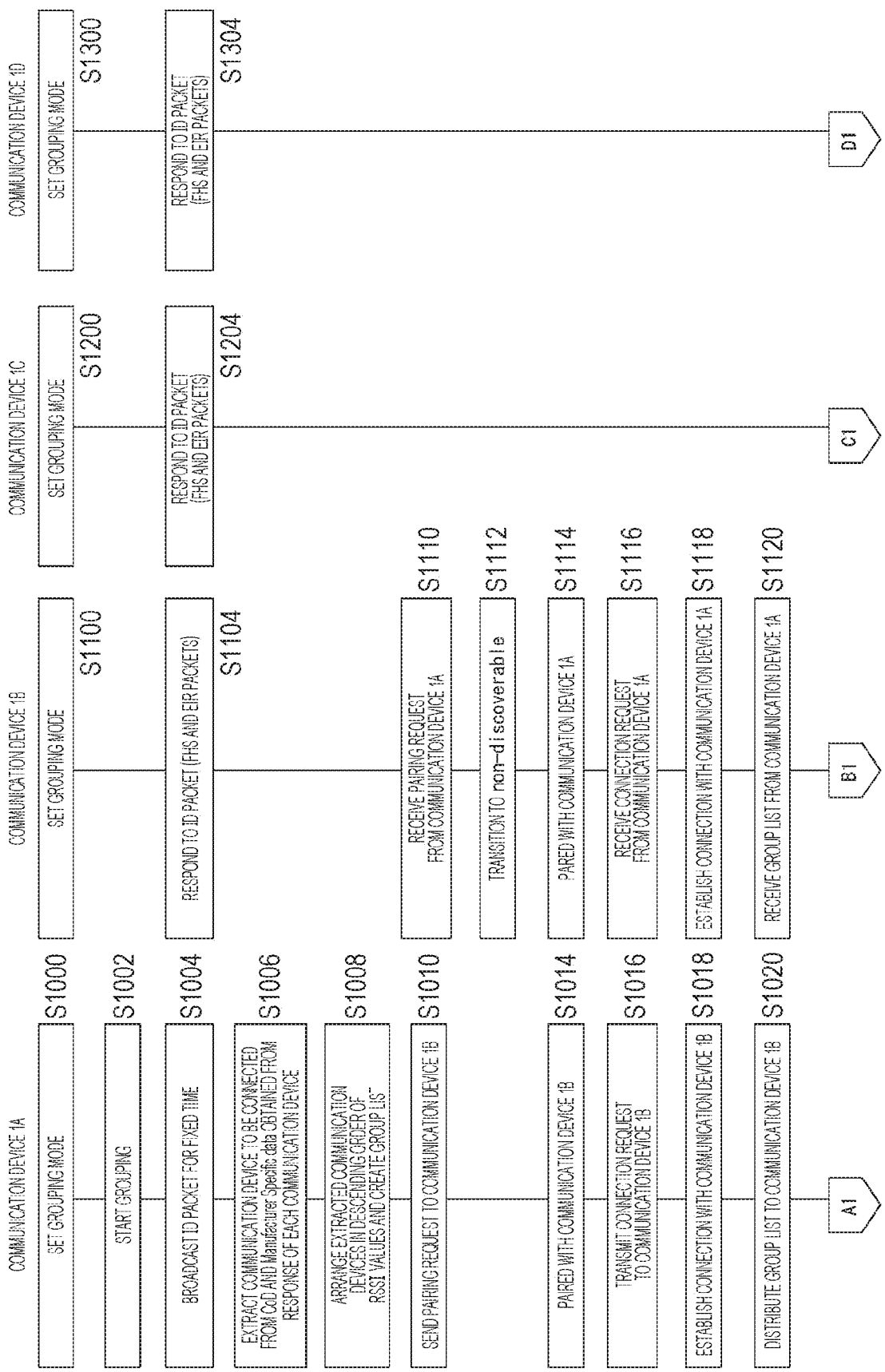
FIG. 5 is a flowchart of a grouping operation according to the embodiment.
Figure 6:
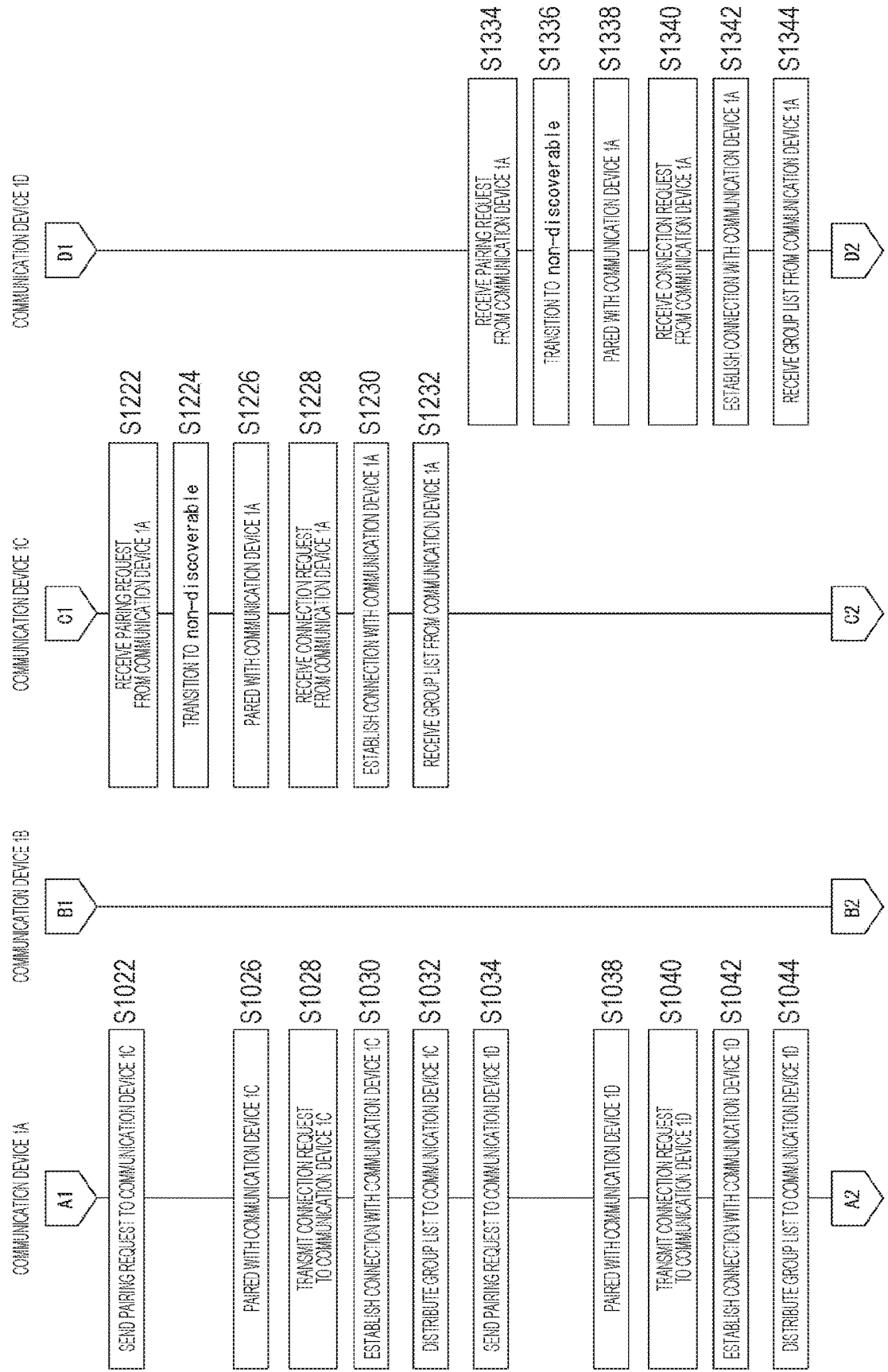
FIG. 6 is a flowchart of the grouping operation according to the embodiment.
Figure 7:
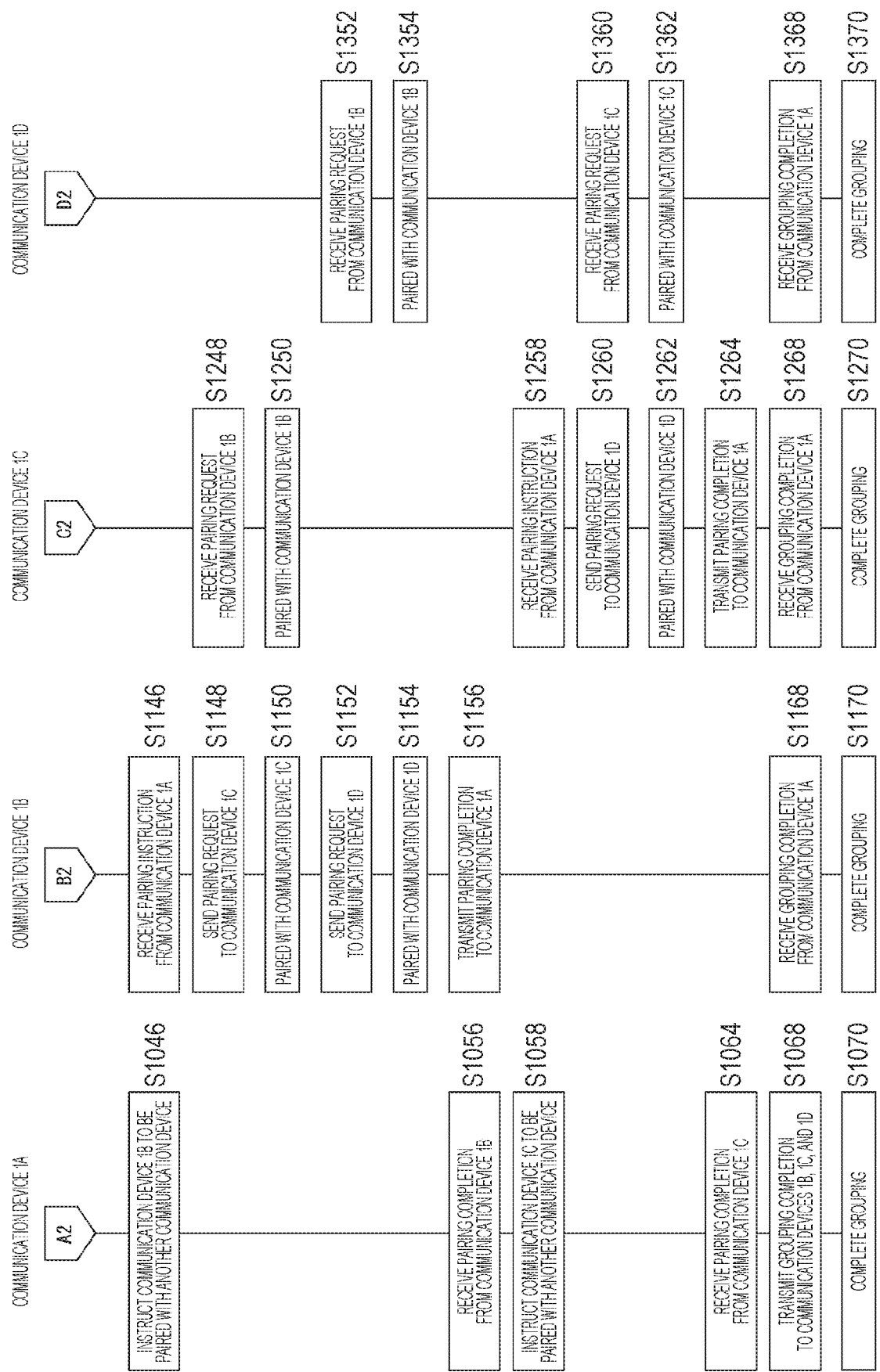
FIG. 7 is a flowchart of the grouping operation according to the embodiment.

A specific grouping operation example will be described with reference to FIGS. 5, 6, and 7. FIGS. 5 to 7 illustrate a flow of control processing by the control units 21 of the respective communication devices 1 (1A, 1B, 1C, and 1D), assuming that the communication devices 1A, 1B, 1C, and 1D in FIG. 4A are grouped.

Note that "A1", "B1", "C1", and "D1" in FIG. 5 represent that the processes proceed to the same symbols in FIG. 6. Furthermore, "A2", "B2", "C2", and "D2" in FIG. 6 represent that the processes proceed to the same symbols in FIG. 7.

For example, the four users respectively carrying the communication devices 1A, 1B, 1C, and 1D in a positional relationship as illustrated in FIG. 4A respectively operate their own communication devices 1 (1A, 1B, 1C, and 1D) to set the communication devices 1 to be in a grouping mode.)

The control unit 21 of each communication device 1 enters a standby state for processing for grouping to be described below as steps S1000, S1100, S1200, and S1300 in FIG. 5 in response to the operation to set the grouping mode. In other words, the communication devices 1A, 1B, 1C, and 1D become discoverable and become searchable by inquiry search (inquiry described below).

One of the plurality of communication devices 1 in the grouping mode functions as a master and grouping processing proceeds. Any of the communication devices 1A, 1B, 1C, and 1D may become the master. When a certain user starts grouping, the communication device 1 that has performed the grouping start operation becomes the master.

In FIG. 5, in step S1002, the communication device 1A starts the grouping processing as the master in response to the grouping start operation.

In this case, in step S1004, the communication device 1A broadcasts an ID packet for a fixed time for query search.

In contrast, the communication devices 1B, 1C, and 1D respectively execute responses to the ID packet (for example, transmission of frequency hop synchronization (FHS) packets and extended inquiry response (EIR) packets) (steps S1104, S1204, and S1304).

In step S1006, the communication device 1A executes processing of extracting a communication device to be connected from class of device (CoD) or manufacturer specific data obtained from the responses of the peripheral devices (devices capable of Bluetooth communication).

For example, there are cases where other Bluetooth compatible devices X1 and X2 exist around the communication device 1A, as illustrated in FIG. 4A, and these devices may return responses to the ID packet from the communication device 1A.

Therefore, the communication device 1A determines whether or not the devices X1 and X2 are the devices to be connected by determining the types of the devices according to the CoD included in the responses.

Furthermore, the communication device 1A can determine whether or not the devices X1 and X2 are the devices to be connected in more detail by setting the manufacturer specific data in the EIR.

By this processing, the communication device 1A can exclude the devices X1 and X2 and extract the communication devices 1B, 1C, and 1D.

Next, in step S1008, the communication device 1A executes group list creation. For example, the communication device 1A creates a group list by arranging the communication devices extracted as the devices to be connected in descending order of values of received signal strength indicator (RSSI).

The communication device 1A stores the RSSI values at the time of receiving the responses from the communication devices (1B, 1C, and 1D). The communication device with a large RSSI value is located near the communication device 1A, and the communication device with a small RSSI value is located at a distant place from the communication device 1A. That is, the communication device 1A creates the group list by arranging the communication devices 1B, 1C, and 1D selected as the devices to be connected in order of proximity to the own device.

Note that, here, the communication devices 1E, 1F, 1G, and 1H in FIG. 4A are not included in the group list. Although the communication devices 1E, 1F, 1G, and 1H are devices of the same model or the same type capable of voice communication of the present embodiment, no response to the ID packet is returned to the communication device 1A because the communication devices 1F, 1G, and 1H do not exist near the communication device 1A at the start of grouping. That is, the communication devices 1F, 1G, and 1H do not exist as viewed from the communication device 1A.

As for the communication device 1E, there is usually no problem because the communication device 1E is usually assumed not to be in the grouping mode at the same time. However, it is conceivable that the communication device 1E becomes in the grouping mode at the same time and is located relatively close to the communication device 1A. In that case, the communication device 1E may return a response to the ID packet of the communication device 1A.

Therefore, the communication device 1E is prevented from being grouped by arranging the communication devices 1 in descending order of the RSSI values and limiting the number of devices in the group.

The communication device 1A sets the number of communication devices in the group to "4" including the own device and arranging the communication devices in descending order of the RSSI values, thereby excluding the communication device with a small RSSI value, that is, the communication device 1E located at a distant place from the communication device 1A from the device to be connected.

Thus, the group list as illustrated in FIG. 4B is created.

The first line of the group list is the communication device 1A that has started the grouping in step S1002. In the second and subsequent lines, BD_ADDRs of the communication devices 1B, 1C, and 1D are listed in descending order of the RSSI values. That is, because of the positional relationship in FIG. 4A, the communication devices 1B, 1C, and 1D are illustrated in order of proximity to the communication device 1A.

Next, in step S1010, the communication device 1A transmits a pairing request to the communication device 1B according to the group list.

In step S1110, the communication device 1B receives the pairing request from the communication device 1A.

In step S1112, the communication device 1B transfers a response mode to a non-discoverable mode so as not to respond to the query search from other Bluetooth devices. Note that, during the grouping processing, the communication device 1B does not return to be discoverable to make a discoverable period as short as possible after entering the grouping mode.

Next, in step S1014, the communication device 1A executes the pairing processing with the communication device 1B. In step S1114, the communication device 1B executes the pairing processing with the communication device 1A.

After completion of the pairing, in step S1016, the communication device 1A transmits a connection request to the communication device 1B.

In step S1116, the communication device 1B receives the connection request from the communication device 1A.

Then, in step S1018, the communication device 1A establishes connection with the communication device 1B. In step S1118, the communication device 1B establishes connection with the communication device 1A.

After establishment of the connection, in step S1020, the communication device 1A executes group list distribution to the communication device 1B. In step S1120, the communication device 1B executes group list reception from the communication device 1A. Thereby, the communication device 1B has acquired the group list as illustrated in FIG. 4B.

The communication device 1A executes, between the communication device 1A and the communication device 1C and between the communication device 1A and the communication device 1D in the order of the group list, each processing according to the same procedure as the "pairing, connection, and group list distribution" between the communication device 1A and the communication device 1B.

In other words, in step S1022 in FIG. 6, the communication device 1A transmits the pairing request to the communication device 1C. In step S1222, the communication device 1C receives the pairing request from the communication device 1A, and in step S1224, the communication device 1C transitions to the non-discoverable mode.

Next, in step S1026, the communication device 1A executes the pairing processing with the communication device 1C. In step S1226, the communication device 1C executes the pairing processing with the communication device 1A.

After completion of the pairing, in step S1028, the communication device 1A transmits the connection request to the communication device 1C. In step S1228, the communication device 1C receives the connection request from the communication device 1A.

Then, in step S1030, the communication device 1A establishes connection with the communication device 1C. In step S1230, the communication device 1C establishes connection with the communication device 1A.

After establishment of the connection, in step S1032, the communication device 1A executes the group list distribution to the communication device 1C. In step S1232, the communication device 1C executes the group list reception from the communication device 1A. Thereby, the communication device 1C has acquired the group list.

Next, in step S1034, the communication device 1A transmits the pairing request to the communication device 1D. In step S1334, the communication device 1D receives the pairing request from the communication device 1A, and in step S1336, the communication device 1D transitions to the non-discoverable mode.

In step S1038, the communication device 1A executes the pairing processing with the communication device 1D. In step S1338, the communication device 1D executes the pairing processing with the communication device 1A.

After completion of the pairing, in step S1040, the communication device 1A transmits the connection request to the communication device 1D. In step S1340, the communication device 1D receives the connection request from the communication device 1A.

Then, in step S1042, the communication device 1A establishes connection with the communication device 1D. In step S1342, the communication device 1D establishes connection with the communication device 1A.

After establishment of the connection, in step S1044, the communication device 1A executes the group list distribution to the communication device 1D. In step S1344, the communication device 1D executes the group list reception from the communication device 1A. Thereby, the communication device 1D has acquired the group list.

As a result of the above processing, a network in which the communication devices 1B, 1C, and 1D are connected around the communication device 1A is established. Furthermore, the communication devices 1B, 1C, and 1D are in the state of acquiring the group list.

Next, the communication device 1A, which is the master device, causes slave devices to perform pairing between the slave devices.

In step S1046 in FIG. 7, the communication device 1A transmits a pairing instruction (slave-slave pairing instruction) with another communication device to the communication device 1B according to the group list.

In step S1146, the communication device 1B receives the pairing instruction from the communication device 1A.

In this case, in step S1148, the communication device 1B transmits the pairing request to the communication device 1C lower than the communication device 1B in the group list.

In step S1248, the communication device 1C receives the pairing request from the communication device 1B.

Then, in step S1150, the communication device 1B executes the pairing processing with the communication device 1C. In step S1250, the communication device 1C executes the pairing processing with the communication device 1B. Thereby, the communication device 1B is paired with the communication device 1C.

Moreover, in step S1152, the communication device 1B transmits the pairing request to the communication device 1D lower than the communication device 1C in the group list. In step S1352, the communication device 1D receives the pairing request from the communication device 1B.

In step S1154, the communication device 1B executes the pairing processing with the communication device 1D. In step S1354, the communication device 1D executes the pairing processing with the communication device 1B. Thereby, the communication device 1B is paired with the communication device 1D.

Since the communication device 1B has been paired with all the communication devices lower than the communication device 1B (the communication devices 1C and 1D in the example in FIG. 4B) in the group list, in step S1156, the communication device 1B transmits a pairing completion notification to the communication device 1A as the master device.

In step S1056, the communication device 1A receives a pairing completion notification from the communication device 1B. In response to the pairing completion notification, the communication device 1A transmits the pairing instruction with another communication device to the communication device 1C lower than the communication device 1B in the group list.

By receiving the pairing instruction from the communication device 1A in step S1258, the communication device 1C performs pairing with a communication device lower than the communication device 1C in the group list in a similar manner to the communication device 1B.

In this case, in step S1260, the communication device 1C transmits the pairing request to the communication device 1D. In step S1360, the communication device 1D receives the pairing request from the communication device 1C.

Then, in step S1262, the communication device 1C executes the pairing processing with the communication device 1D. In step S1362, the communication device 1D executes the pairing processing with the communication device 1C. Thereby, the communication device 1C is paired with the communication device 1D.

Since the communication device 1C has been paired with all the communication devices lower than the communication device 1C (the communication device 1D in the example in FIG. 4B) in the group list, in step S1264, the communication device 1C transmits a pairing completion notification to the communication device 1A as the master device.

In step S1064, the communication device 1A receives the pairing completion notification from the communication device 1C.

It is sufficient that the communication device 1A executes the pairing instruction (slave-slave pairing instruction) with another communication device up to the one higher communication device (the communication device 1C in this example) than the lowest communication device in the group list.

Therefore, in this example, when the communication device 1A receives the pairing completion notification from the communication device 1C, it can be determined that the pairing in all the combinations of the communication devices has been completed.

Therefore, in step S1068, the communication device 1A transmits a grouping completion notification to each of the communication devices 1B, 1C, and 1D. Then, in step S1070, the communication device 1A terminates the grouping processing as grouping completion.

In step S1168, the communication device 1B receives the grouping completion notification from the communication device 1A, and in step S1170, the communication device 1B terminates the grouping processing in response to the notification.

In step S1268, the communication device 1C receives the grouping completion notification from the communication device 1A, and in step S1270, the communication device 1C terminates the grouping processing in response to the notification.

In step S1368, the communication device 1D receives the grouping completion notification from the communication device 1A, and in step S1370, the communication device 1D terminates the grouping processing in response to the notification.

The pairing has been completed in all the combinations among the communication devices 1A, 1B, 1C, and 1D.

It is understood that, in the above grouping operation, pairing between each of two of three or more devices is possible by the user simply performing one-time pairing operation. That is, it is sufficient that each user first sets his/her own device to be in the grouping mode, and one of the users performs the grouping start operation. Thereby, grouping of devices that perform voice communication becomes possible.

Furthermore, the master device (the device that has started grouping) can transmit the ID packet and can determine whether or not the slave device that has received the ID packet is a device to be grouped according to the information included in the FHS packet and the EIR packet from the slave device.

Furthermore, the master device can set the device having a high received signal strength indicator to be the device to be grouped and can exclude the device having a low received signal strength indicator from the device to be grouped according to the received signal strength indicator (RSSI) in the received FHS packet.

Furthermore, the master device can perform grouping of the devices that perform voice communication by creating the group list using the information and the RSSI values included in the FHS packets and the EIR packet.

The group list indicates each device by including the Bluetooth device address BD_ADDR of each communication device 1.

Then, the master device executes pairing with each device included in the group list.

Furthermore, the master device distributes the created group list to each slave device included in the group list.

The pairing between the slave devices included in the group list excluding the master device is performed in accordance with the group list according to the instruction from the master device.

3. Processing Example of Communication Device

A processing algorithm of the communication device 1 that enables the above-described grouping processing, in other words, a processing algorithm as the list information processing unit 21b and the pairing processing unit 21c will be mainly described. The following is an example of processing performed by the control unit 21 on the basis of a program. Each communication device 1 can perform the grouping processing as the master device or the slave device, as the control unit 21 of the each communication device 1 performs the processing in FIGS. 8 to 12 below.

Figure 8:
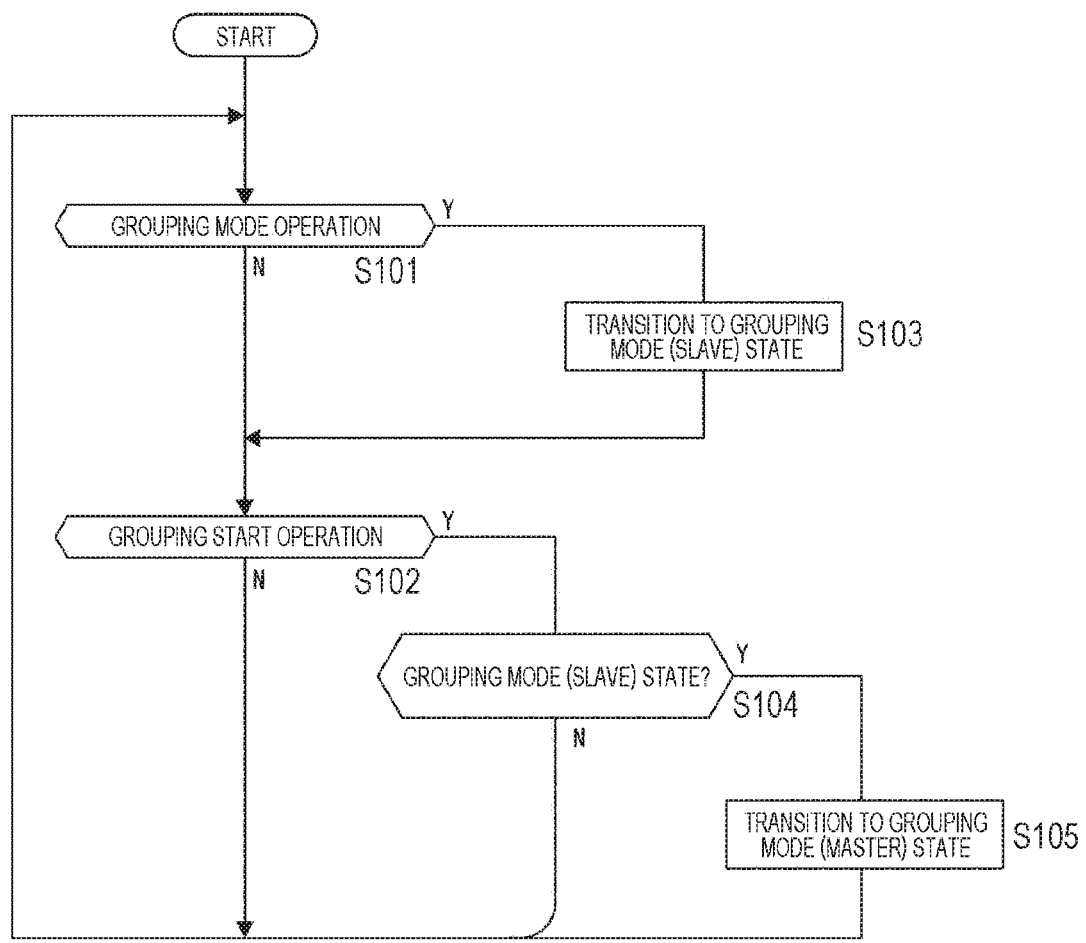
FIG. 8 is a flowchart of grouping mode transition processing of the communication device according to the embodiment.

FIG. 8 illustrates processing of transition to the grouping mode by the communication device 1.

When detecting a grouping mode operation by the user, the control unit 21 proceeds from step S101 to step S103 and transitions to the grouping mode. In this state, the communication device 1 transitions to the grouping mode as the slave device. This process corresponds to the processes in steps S1000, S1100, S1200, and S1300 in the communication devices 1A, 1B, 1C, and 1D in FIG. 5.

Further, when detecting the grouping start operation by the user, the control unit 21 proceeds from step S102 to step S104, and transitions to the grouping mode as the master device in step S105 when the communication device 1 is already in the grouping mode state. This process corresponds to the process in step S1002 in the communication device 1A in FIG. 5.

Note that, of course, the control unit 21 also accepts operations other than the grouping mode operation and the grouping start operation, but the processing in those cases are not illustrated and described.

Figure 9:
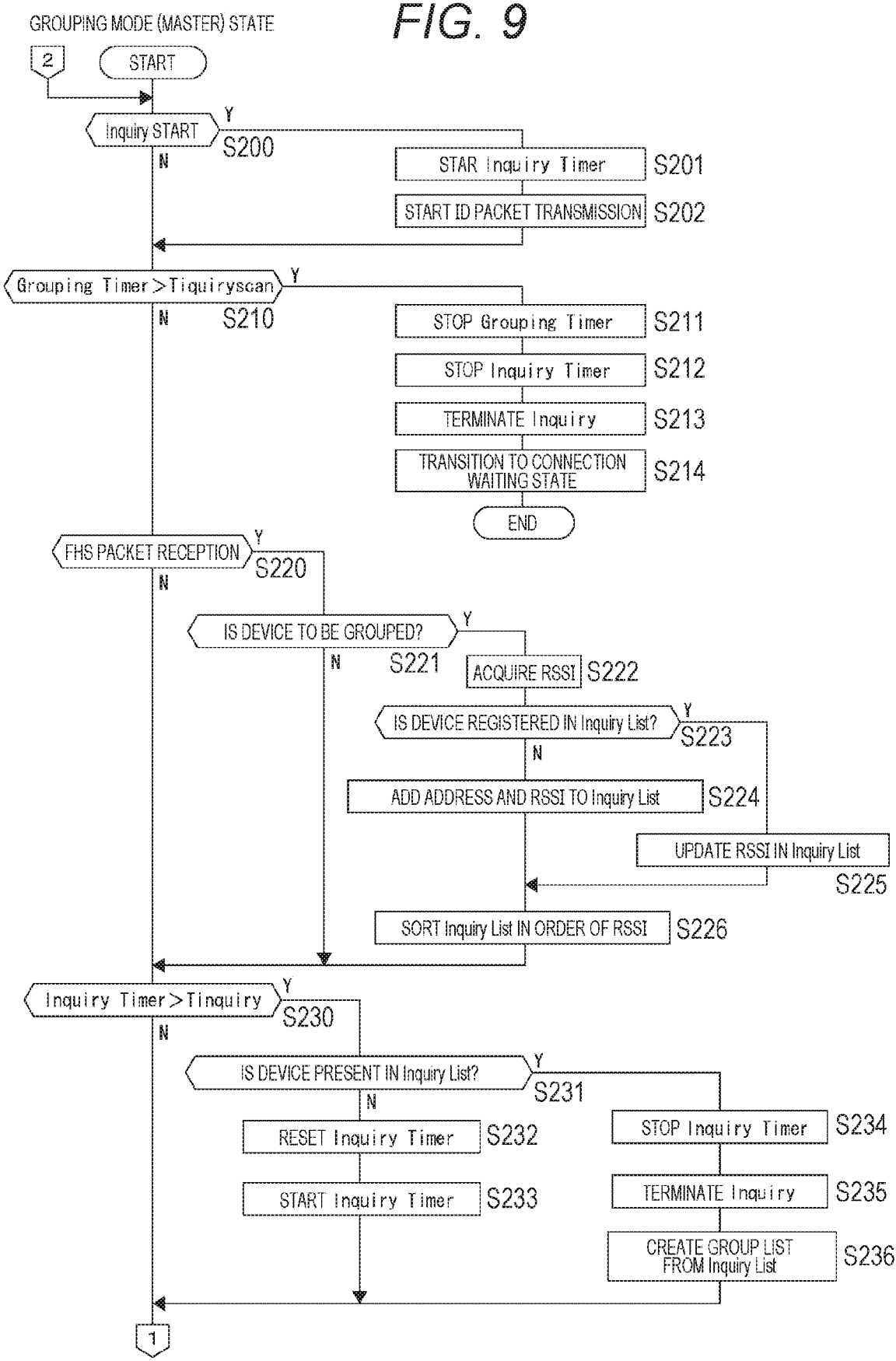
FIG. 9 is a flowchart of the grouping mode processing in a master state of the communication device according to the embodiment.
Figure 10:
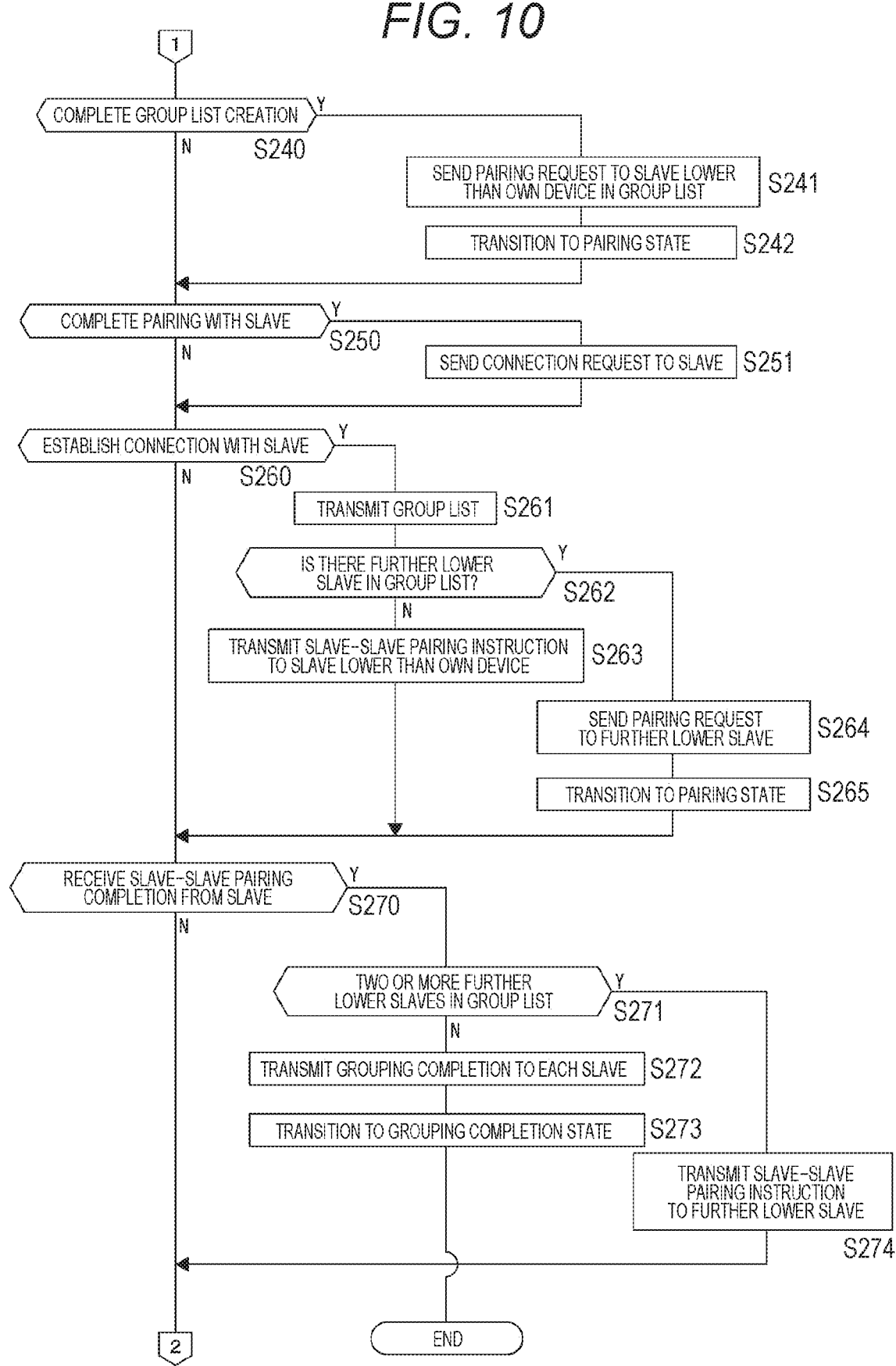
FIG. 10 is a flowchart of the grouping mode processing in the master state of the communication device according to the embodiment.

FIG. 9 and FIG. 10 illustrate processing executed in a case where the communication device 1 transitions to the grouping mode as the master device. That is, the processing corresponds to the processing in the case of the communication device 1A in FIG. 5. Note that the processing in FIG. 9 is illustrated to continue to FIG. 10.

The control unit 21 of the communication device 1 as the master device repeats the processing of the check loop of steps S200, S210, S220, S230, S240, S250, S260, and S270 illustrated in FIGS. 9 and 10.

In step S200 in FIG. 9, the control unit 21 determines whether or not it is start timing of an inquiry. The inquiry is processing of inquiring peripheral devices and obtaining a list of the peripheral devices.

The timing when the communication device 1 becomes the master device is the start timing of the inquiry. In that case, in step S201, the control unit 21 starts an inquiry timer, and in step S202, the control unit 21 starts transmission of the ID packet. The inquiry timer is a timer that counts a period of the inquiry (transmission of the ID packet).

Note that the period of one inquiry is defined by a set time Tinquiry. The set time Tinquiry is, for example, 10 seconds, or the like.

In step S210, the control unit 21 confirms whether or not a grouping timer has reached a certain set time Tiquiryscan.

The grouping timer is a timer that counts a period of the grouping mode, and starts counting in step S301 in FIG. 11 described below when the communication device 1 is set to in the grouping mode as the slave device. As can be seen from FIG. 8, the communication device 1, which has transitioned to the grouping mode as the master device, had temporarily transitioned to the grouping mode as the slave device when the grouping mode operation was first performed, so the counting of the grouping timer has started and still being executed after transitioning to the master state.

The set time Tiquiryscan indicates a time limit of the period of the grouping mode, and is, for example, 30 seconds, or the like. In either case of the master device or the slave device, the communication device can leave the grouping mode by timeout of the grouping timer.

In a case where the grouping timer has reached the set time Tiquiryscan, the control unit 21 proceeds from step S210 to step S211, stops the grouping timer, stops the inquiry timer in step S212, and terminates the inquiry in step S213. Then, in step S214, the control unit 21 transitions to a connection waiting state. That is, the grouping mode is terminated.

In step S220, the control unit 21 confirms reception of the FHS packet. In a case where the FHS packet has been received, in step S221, the control unit 21 confirms whether or not the FHS packet is from the device to be grouped. For example, the control unit 21 determines whether or not the transmission source of the FHS packet is the communication device to be connected from the CoD or the manufacturer specific data, as described above.

In a case where the transmission source of the FHS packet is not the communication device to be connected, the control unit 21 performs no particular processing (S221→NO). In a case where the transmission source of the FHS packet is the device to be grouped, the control unit 21 proceeds to step S222 and acquires the RSSI value. Then, in step S223, the processing branches depending on whether or not the device has been already registered in an inquiry list. The inquiry list is a list of the peripheral devices detected by the inquiry.

In a case where the device is not a device registered in the inquiry list, the control unit 21 proceeds to step S224 and adds the BD_ADDR and the RSSI of the device detected this time to the inquiry list.

In a case where the device is the device registered in the inquiry list, the control unit 21 proceeds to step S225 and updates the RSSI corresponding to the BD_ADDR of the device detected this time in the inquiry list.

Then, after these processes, in step S226, the control unit 21 sorts the inquiry list in order of RSSI.

In step S230, the control unit 21 confirms whether or not the inquiry timer has reached a certain set time Tinquiry.

In a case where the inquiry timer has reached the set time Tinquiry, the control unit 21 proceeds to step S231 and confirms whether or not there is a device in the inquiry list.

If there is no device on the inquiry list, the control unit 21 continues to execute the inquiry. That is, the control unit 21 proceeds to step S232, resets the inquiry timer, and starts the inquiry timer in step S233.

On the other hand, in a case where it is confirmed in step S231 that there is a device in the inquiry list, the control unit 21 stops the inquiry timer in step S234 and terminates the inquiry in step S235.

Then, in step S236, the control unit 21 creates the group list as described above from the inquiry list at that time.

In step S240 in FIG. 10, the control unit 21 confirms completion of group list creation. That is, when the group list creation is completed, the control unit 21 proceeds from step S240 to S241 and sends the pairing request to the slave device lower than the own device in the group list. Then, in step S242, the control unit 21 transitions to a pairing state.

In step S250, the control unit 21 confirms completion of the pairing with the slave device. That is, when the pairing with the slave device is completed, the control unit 21 proceeds from step S250 to S251 and sends the connection request to the paired slave device.

In step S260, the control unit 21 confirms establishment of connection with the slave device. That is, when the connection establishment with the slave device is completed, the control unit 21 proceeds from step S260 to S261 and transmits the group list to the connected slave device.

In step S262, the control unit 21 confirms whether or not there is a further lower slave device in the group list.

If not present, in step S263, the control unit 21 transmits the slave-slave pairing instruction to the slave device immediately below the own device.

Meanwhile, in a case where there is a slave device further lower than the connected slave device in the group list, the control unit 21 requests the further lower slave device of pairing in step S264 and transitions to the pairing state in step S265.

In step S270, the control unit 21 confirms reception of slave-slave pairing completion. When the control unit 21 confirms a notification of the slave-slave pairing completion, the control unit 21 proceeds to step S271. Then, the control unit 21 confirms whether or not there are two or more further lower slave devices (than the slave device that has transmitted the pairing completion) in the group list.

In a case where there are two or more slave devices, in step S274, the control unit 21 transmits the slave-slave pairing instruction to the slave device next lower than the slave device that has transmitted the pairing completion.

In a case where two or more slave devices are not present, in step S272, the control unit 21 transmits the grouping completion notification to each slave device. Then, in step S273, the control unit 21 transitions to a grouping completion state. That is, the grouping mode is terminated.

Next, processing in the grouping mode performed by the communication device 1 as the slave device will be described with reference to FIGS. 11 and 12. That is, the processing corresponds to the processing in the case of the communication devices 1B, 1C, and 1D in FIG. 5. Note that the processing in FIG. 11 is illustrated to continue to FIG. 12.

Figure 11:
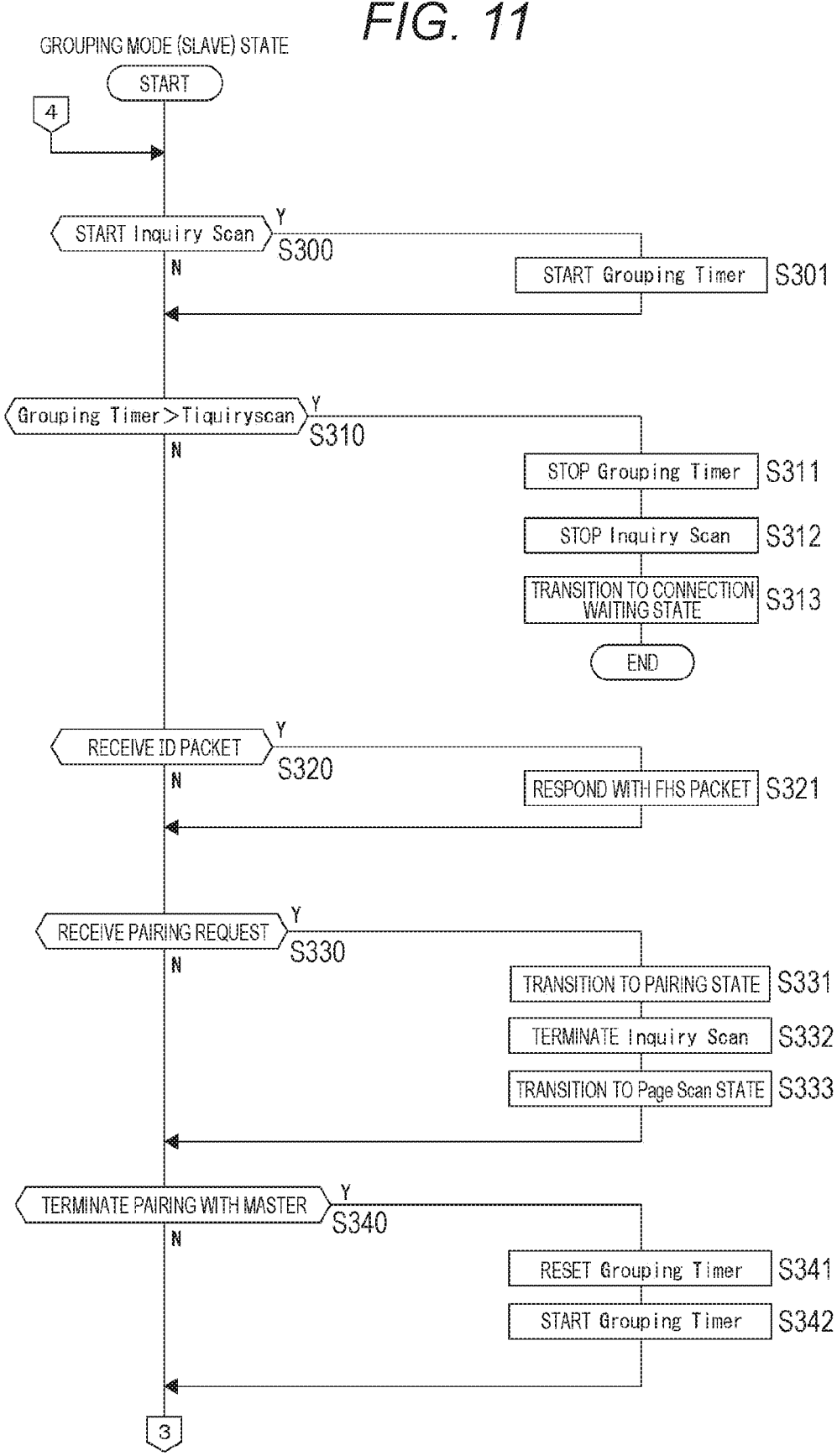
FIG. 11 is a flowchart of the grouping mode processing in a slave state of the communication device according to the embodiment.
Figure 12:
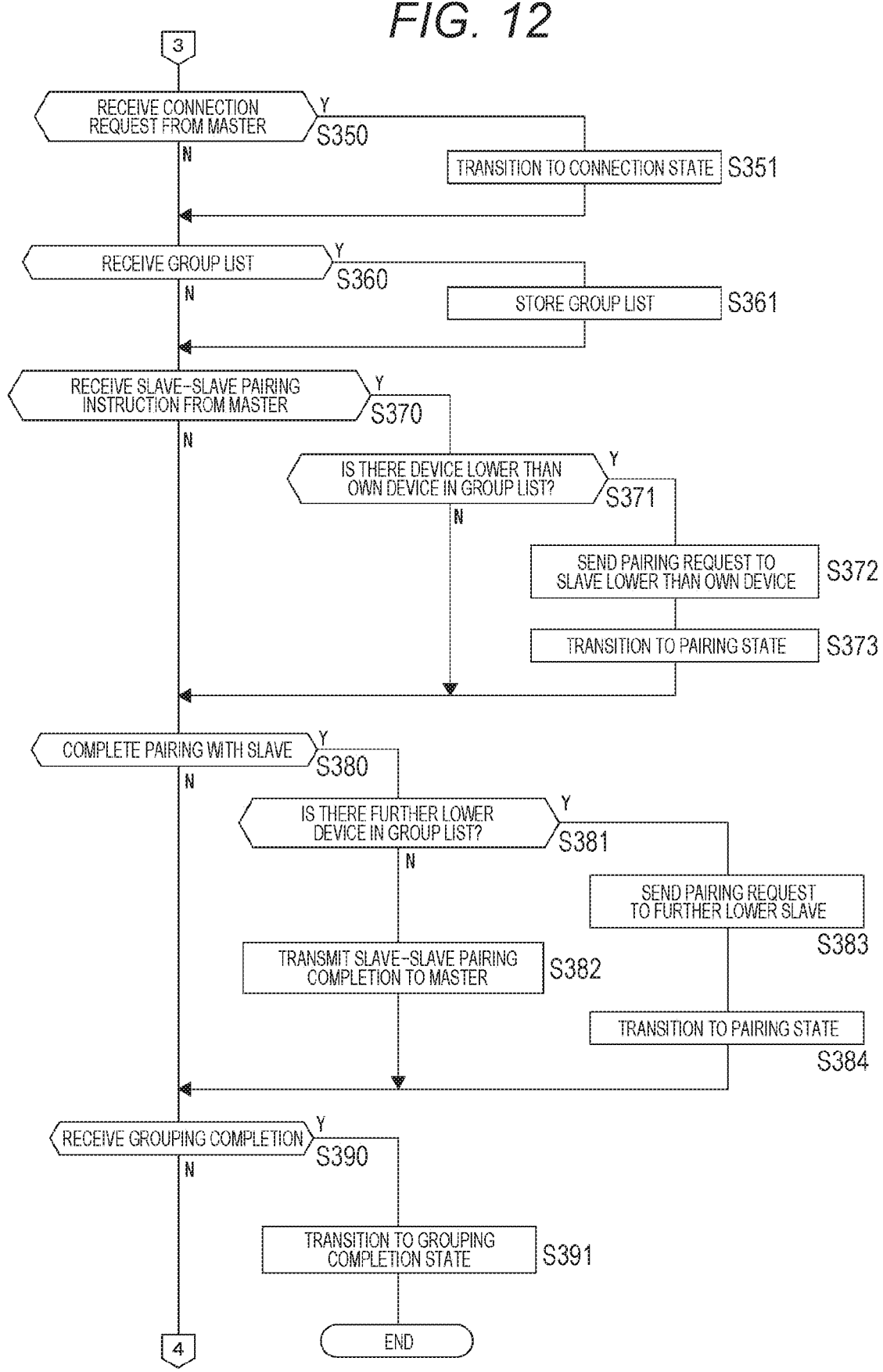
FIG. 12 is a flowchart of the grouping mode processing in the slave state of the communication device according to the embodiment.

The control unit 21 of the communication device 1 as the slave device repeats the processing of the check loop of steps S300, S310, S320, S330, S340, S350, S360, S370, S380, and S390 illustrated in FIGS. 11 and 12.

In step S300 in FIG. 11, the control unit 21 determines whether or not it is start timing of inquiry scan corresponding to the inquiry. This timing is the timing when the communication device 1 has transitioned to the grouping mode. In this case, in step S301, the control unit 21 starts the grouping timer.

In step S310, the control unit 21 confirms whether or not the grouping timer has reached the set time Tiquiryscan.

In a case where the grouping timer has reached the set time Tiquiryscan, the control unit 21 stops the grouping timer in step S311 and terminates the inquiry scan in step S312. Then, in step S313, the control unit 21 transitions to the connection waiting state. That is, the grouping mode is terminated.

In step S320, the control unit 21 confirms reception of the ID packet from the master device. In a case where the ID packet has been received, in step S321, the control unit 21 responds with the FHS packet.

In step S330, the control unit 21 confirms reception of the pairing request. In a case where the pairing request has been received, in step S331, the control unit 21 transitions to the pairing state.

Note that, as understood from the above description, the pairing request is transmitted not only from the master device but also from other slave devices.

Then, in step S332, the control unit 21 terminates the inquiry scan, and in step S333, the control unit 21 transitions to a page scan state. That is, the discoverable state responding to the inquiry is terminated, and the non-discoverable state corresponding to a call by an address is set.

In step S340, the control unit 21 confirms the end of pairing with the master device.

In a case where pairing with the master device ends, the control unit 21 resets the grouping timer in step S341, and starts the grouping timer in step S342.

In step S350, the control unit 21 confirms reception of the connection request from the master device. In a case where the connection request has been received, in step S351, the control unit 21 transitions to the connection state.

At step S360, the control unit 21 confirms reception of the group list. In a case where the group list has been received, in step S361, the control unit 21 performs processing of storing the group list.

In step S370, the control unit 21 confirms reception of the slave-slave pairing instruction from the master device. In a case where the instruction has been received, in step S371, the control unit 21 confirms whether or not there is a device lower than the own device in the group list. If there is no lower device, the control unit 21 performs no particular processing.

In a case where there is a device lower than the own device, in step S372, the control unit 21 sends the pairing request to the lower slave device. Then, in step S373, the control unit 21 transitions to the pairing state.

In step S380, the control unit 21 confirms the end of the pairing with the slave device.

In a case where pairing with the slave device ends, in step S381, the control unit 21 confirms whether or not there is a lower slave device (lower than the paired slave device) in the group list.

In a case where there is the lower device, in step S383, the control unit 21 sends the pairing request to the lower slave device. Then, in step S384, the control unit 21 transitions to the pairing state.

In a case where there is no slave device lower than the paired slave device, in step S382, the control unit 21 transmits a slave-slave pairing completion notification to the master device.

In step S390, the control unit 21 confirms reception of the grouping completion notification. In a case where the grouping completion notification has been received, in step S391, the control unit 21 transitions to the grouping completed state. That is, the grouping mode is terminated.

Since each communication device 1 is capable of executing the processing in FIG. 8 to FIG. 12 described above, each communication device 1 behaves as one of the communication devices 1A to 1D in FIGS. 5 to 7, and automatic grouping is executed.

4. Conclusion and Modification

The communication device 1 of the above-described embodiment includes the list information processing unit 21b that generates or acquires the group list indicating a device selected as a device capable of wireless communication and as a device capable of corresponding to a group that performs communication, and the pairing processing unit 21c that performs the pairing processing of setting the own device and the communication device 1 indicated in the group list to be wireless communication targets to each other by reference to the group list.

Thereby, even if the user of each communication device 1 does not perform an operation to give an instruction on pairing with each of the other communication devices 1, pairing can be automatically performed among the plurality of grouped communication devices 1.

In a case where a group call among three or more communication devices 1 is performed, for example, the operation for pairing of the communication devices 1 has been very complicated and the usability has been bad. Furthermore, grouping in pairing with many devices in a round-robin manner has taken a very long time to confirm the operation and to obtain understanding of each person, for example.

In contrast, in the present embodiment, all the pairings are automatically and efficiently performed. Therefore, the operation burden on the user is significantly reduced. For example, it is sufficient that each user performs the operation to set the grouping mode, and one user (the user who carries the communication device 1A, for example) performs the grouping start operation.

Furthermore, since not all the users perform the pairing start operation, all the pairings can be completed in a very short time without confusion by the operation.

Furthermore, in a case of each user's operation, unpaired devices may occur but such unpaired devices do not occur.

Note that an example in which the trigger of the start of grouping is the user's operation has been described. However, this operation can be automated.

In the processing in a case where the communication device 1 according to the embodiment becomes the master device, two or more devices to be connected capable of corresponding to a group that performs communication are selected from among the devices capable of wireless communication on the basis of predetermined information in response to the grouping start trigger (for example, the grouping start operation), and the group list indicating the own device and the two or more devices to be connected is generated.

In other words, the group list is created as an operation of the communication device 1 that serves as the master in grouping.

To create the group list, other devices capable of wireless communication existing in the periphery are searched for, and the devices to be grouped among the searched devices are set as the devices to be connected. Then, the own device and the devices to be connected are listed, and the group list that specifies the devices to be grouped is created. Thereby, the group list that can be appropriately used for pairing between devices that the users want to form a group can be created.

Then, pairing is performed on the basis of the group list. In doing so, the inquiry response is performed only once before creating the group list. Therefore, pairing is not accidentally or intentionally performed by the third party, and an advantage of high security can also be obtained.

Note that the inquiry response can be performed with limited inquiry access code (LIAC) as a modification. In a case of using the LIAC, since the inquiry from a smartphone or a PC uses general inquiry access code (GIAC), the device is not detected, and pairing is not accidentally or intentionally performed by the third party and high security can be secured.

Furthermore, the device type information received from another device capable of wireless communication, for example, the CoD or the manufacturer specific data is used as the predetermined information for selecting the device to be connected for generating the group list.

That is, the communication device that becomes the master in grouping selects the device to be connected from among peripheral devices capable of wireless communication according to the device type.

Thereby, the device of the type suitable for grouping, as viewed from the master device, for example, the device suitable for voice communication for conversation in the group, as in the present embodiment, is automatically selected as the device to be connected, and the group list is generated. Therefore, even if there are devices capable of Bluetooth communication such as a smartphone, a music player, a speaker, a communication device incompatible with voice communication, and a communication device for different purposes, for example, the group list can be created excluding such devices.

For this reason, to perform an objective grouping, unnecessary pairing can be avoided and the series of pairing operations for grouping can be made efficient. For example, by listing only the voice communication devices of the present embodiment in the group list, grouping can be made more efficient and completed in a short time.

Furthermore, in the processing of the master device according to the embodiment, an example of generating group list information indicating device identification information (BD_ADDS) of the selected devices to be connected in descending order from a device having a high RSSI value has been described.

Thereby, a situation in which pairing is executed in order from the device with the high received signal strength indicator can be produced. This increases the possibility of efficient grouping.

Furthermore, since whether or not the slave device is the device to be paired is selected according to the RSSI of the slave device at the time of inquiry response, the possibility of erroneous pairing is low even if a third party who purchased the same device performs grouping at the same timing.

Furthermore, in the processing of the master device according to the embodiment, an example of generating the group list indicating devices within an upper limit number set including the own device has been described.

That is, the communication device 1 serving as the master in grouping creates the group list limiting the number of devices to within the upper limit number.

This enables grouping within the number of devices suitable for use mode, for example, for a voice call for conversation or the like. The processing according to the embodiment is suitable for grouping of the number of devices suitable for the processing capacity of the communication system and the devices, the amount of communication, a use band, a use form, or the circumstances according to the purpose of use. For example, in a case of a communication system in which the voice communication performance is degraded when the number of devices increases, the processing according to the embodiment is effective in a case of limiting the number of devices to the number that can maintain good voice communication performance, for example.

Moreover, in the case of listing the devices in descending order from the device with high received signal strength indicator (RSSI), as described above, devices with low received signal strength can be excluded from the devices to be grouped by limiting the number of devices. Thereby, only devices that can perform good communication can be set to the devices to be grouped.

Note that the upper limit number may be able to be set by the user before grouping. For example, in the case of a group of four, the upper limit number is four, and in the case of a group of five, the upper limit number is five. In doing so, the communication device 1E of the unrelated person illustrated in FIGS. 4A and 4B can be more effectively prevented from being paired.

In the processing of the master device according to the embodiment, the pairing processing is sequentially performed with each of the devices to be connected (slave devices) indicated in the group list (S241 and S264).

This enables pairing between the master device and each of a plurality of other slave devices. In this case, by specifying slave devices according to the group list, an unnecessary pairing operation is not performed. That is, pairing with the device capable of wireless communication but not the device to be connected is not performed. Therefore, appropriate grouping according to the purpose of use of the communication devices can be performed and grouping can be made efficient.

In the processing of the master device according to the embodiment, transmission control of the group list is performed for all or part of the devices to be connected (slave devices) indicated in the group list (S261).

Thereby, the slave devices can receive and acquire the group list generated by the master device. With the acquisition, the devices in the group can share the group list.

Note that the master device may transmit the group list to part of the slave devices, and the received slave device may transmit the group list to the other slave devices. In any case, it is sufficient that all the devices listed in the group list can share the group list created by the master device.

In the processing of the master device according to the embodiment, transmission control of a pairing execution instruction using the group list is performed on the slave device as the transmission destination of the group list (S263 and S274).

Thereby, the slave device is paired with another slave device. This allows each device in the group to form a paired state with all the other devices.

In the processing of the slave device according to the embodiment, the group list information is acquired by receiving the group list information transmitted from the paired device, from the master device, for example (S361).

Thereby, the slave device can refer to the group list, and can perform pairing using the group list.

In the processing of the slave device according to the embodiment, transition is made to a state of not responding to any pairing request other than a pairing request specifying the own device in response to reception of the first pairing request after the start of grouping.

That is, the slave device executes the pairing processing in response to the request from another device but transitions to be in the non-discoverable state of not responding to an inquiry not specifying the own device (for example, an inquiry from a third device), thereby accurately executing the pairing processing without responding to the inquiry from another Bluetooth device.

In particular, in the embodiment, the communication devices 1B, 1C, and 1D, which are slave devices, transition to the non-discoverable state when the pairing request is first sent from the communication device 1A. Furthermore, since the BD_ADDR (Bluetooth device address) is clear by receiving the group list, the slave devices can be kept non-discoverable in pairing between the slave devices.

This means that the devices have been devised to reduce the time of being discoverable as much as possible.

That is, after receiving the pairing request, each slave device becomes non-discoverable, so the each slave device is not paired with a third party accidentally or intentionally, and high security can be secured.

Note that the timing of transition to non-discoverable is not limited to immediately after receiving the pairing request and may be another timing, for example, after pairing completion with the master device, connection completion with the master device, or the like. In other words, various timings can be considered as the timing to reduce the time of being discoverable.

In the processing of the slave device according to the embodiment, the pairing processing is performed with an unpaired device among the devices indicated in the group list in response to reception of the pairing execution instruction (S372).

In other words, the communication device 1 serving as the slave device in grouping confirms another slave device on the basis of the group list, and is paired with the another slave device in response to the pairing execution instruction from the master device.

Thereby, pairing between the slave devices is executed. In other words, each of the devices in the group list can form a paired state with each of the other devices.

In the processing of the slave device according to the embodiment, the pairing completion notification is sent to the transmission source device of the pairing execution instruction when the pairing processing with all of the unpaired devices among the devices indicated in the group list has been completed (S382).

Thereby, the master device can recognize the pairing between the slave devices. Therefore, the series of grouping processing can be smoothly performed while grasping the pairing between the slave devices.

The communication device 1 according to the embodiment includes a voice input unit (microphone 13 and input amplifier 26), a voice output unit (speaker 12 and output amplifier 27), and a codec unit (audio codec 24) for encoding and decoding a voice signal and performs communication of a call voice.

In this case, a system with automatically optimized grouping can be realized as a communication device for conversational communication or the like. For example, it is not necessary for the users to perform complicated operations such as the pairing operations between the communication devices used by the users, and an environment where a group call can be very easily performed can be realized for the users.

Note that the technology of the present disclosure is not limited to the example of the embodiment.

The SoC 10 illustrated in FIGS. 1A and 1B is configured by, for example, a Bluetooth wireless unit, an MCU, a DSP, a ROM, an I/O, a flash ROM, a RAM, an audio codec, an audio amplifier, or the like, but the aforementioned elements may be able to be used in combination as components.

Furthermore, although an example of using the four communication devices 1 has been described in the embodiment. However, the present technology is useful for a configuration including three or more communication devices 1. In the case of the communication device 1 using Bluetooth communication, the communication device 1 can be implemented in three to eight devices, and the above-described effects can be obtained. Note that it goes without saying that the communication operation can be performed even in a case of using two communication devices 1 to which the present technology is applied.

The present technology supports inquiry response by general inquiry access code (GIAC), and also supports inquiry response by limited inquiry access code (LIAC).

As specific product examples to which the present technology can be applied, a Bluetooth headset, a Bluetooth headphone, a Bluetooth speaker, an intercom device for motorcycles and bicycles, and the like are assumed.

A program of the embodiment is a program for causing an arithmetic processing unit to execute a list information processing step of generating or acquire group list indicating a device selected as a device capable of wireless communication and as a device capable of corresponding to a group that performs communication, and a pairing processing step of performing pairing processing of setting the own device and a communication device indicated in the group list to be wireless communication targets to each other by reference to the group list information.

In other words, the program causes an arithmetic processing unit to execute the processing in FIGS. 8, 9, 10, 11, and 12.

Such a program facilitates the implementation of the communication device 1 of the present embodiment.

Then such a program can be stored in advance in a recording medium incorporated in a device such as a computer device, a ROM in a microcomputer having a CPU, or the like. Alternatively, such a program can be temporarily or permanently stored in a removable recording medium such as a semiconductor memory, a memory card, an optical disk, a magneto-optical disk, or a magnetic disk. Furthermore, such a removable recording medium can be provided as so-called package software.

Furthermore, such a program can be installed from a removable recording medium to a personal computer or the like, and can also be downloaded from a download site via a network such as a LAN or the Internet.

Note that the effects described in this specification are merely examples and are not limited, and other effects may be exhibited.

Note that the present technology can also have the following configurations.

(1) A communication device including:

a list information processing unit configured to generate or acquire group list information indicating a device selected as a device capable of wireless communication and as a device capable of corresponding to a group that performs communication; and a pairing processing unit configured to perform pairing processing of setting the own device and a communication device indicated in the group list information to be wireless communication targets to each other by reference to the group list information.

(2) The communication device according to (1), in which the list information processing unit selects two or more devices to be connected capable of corresponding to a group that performs communication on the basis of predetermined information from among the devices capable of wireless communication in response to a grouping start trigger, and generates the group list information indicating the own device and the two or more devices to be connected.

(3) The communication device according to (2), in which the list information processing unit selects the devices to be connected, using device type information received from another device capable of wireless communication as the predetermined information.

(4) The communication device according to (2) or (3), in which the list information processing unit generates the group list information indicating device identification information of the selected devices to be connected in descending order from a device having a high received signal strength indicator.

(5) The communication device according to any one of (2) to (4), in which the list information processing unit generates the group list information indicating devices within an upper limit number set including the own device.

(6) The communication device according to any one of (2) to (5), in which the pairing processing unit performs the pairing processing with each of the devices to be connected indicated in the group list information.

(7) The communication device according to any one of (2) to (6), in which the pairing processing unit performs transmission control of the group list information to all or part of the devices to be connected indicated in the group list information.

(8) The communication device according to (7), in which the pairing processing unit performs transmission control of a pairing execution instruction using the group list information to a transmission destination device of the group list information.

(9) The communication device according to (1), in which the list information processing unit acquires the group list information by receiving the group list information transmitted from a paired device.

(10) The communication device according to (9), in which the pairing processing unit transitions to a state of not responding to any pairing request other than a pairing request specifying the own device in response to reception of a first pairing request after start of grouping.

(11) The communication device according to (9) or (10), in which the pairing processing unit performs the pairing processing with an unpaired device among the devices indicated in the group list information in response to reception of a pairing execution instruction.

(12) The communication device according to (11), in which the pairing processing unit sends a pairing completion notification to a transmission source device of the pairing execution instruction when completing the pairing processing with all of unpaired devices among the devices indicated in the group list information.

(13) The communication device according to any one of (1) to (12), further including:
a voice input unit, a voice output unit, and a codec unit configured to encode and decode a voice signal, and the communication device configured to perform communication of a call voice.

(14) A communication device pairing method including:
a list information processing process of generating or acquire group list information indicating a device selected as a device capable of wireless communication and as a device capable of corresponding to a group that performs communication; and
a pairing processing process of performing pairing processing of setting the own device and a communication device indicated in the group list information to be wireless communication targets to each other by reference to the group list information.

(15) A program for causing an arithmetic processing unit to execute:
a list information processing step of generating or acquire group list information indicating a device selected as a device capable of wireless communication and as a device capable of corresponding to a group that performs communication; and
a pairing processing step of performing pairing processing of setting the own device and a communication device indicated in the group list information to be wireless communication targets to each other by reference to the group list information.

REFERENCE SIGNS LIST 1, 1A, 1B, 1C, 1D Communication device
10 Bluetooth SoC
11 Antenna
12 Speaker
13 Microphone
21 Control unit
21a Communication control unit
21b List information processing unit
21c Pairing processing unit
22 Memory unit
23 Wireless communication unit
24 Audio codec
25 Audio interface
26 Input amplifier
27 Output amplifier

The invention claimed is:
1. A first communication device, comprising:
a list information processing unit configured to:
transmit an ID packet to a plurality of communication devices;
receive a plurality of responses from the plurality of communication devices based on the transmitted ID packet, wherein
each response of the plurality of responses includes device type information of a corresponding communication device of the plurality of communication devices, and
the device type information indicates a class of device (CoD) of the corresponding communication device;
select at least two communication devices of the plurality of communication devices based on the device type information, wherein the selected at least two communication devices include a second communication device and a third communication device;
generate group list information that indicates the first communication device and the selected at least two communication devices,
wherein each communication device indicated in the group list information executes a peer to peer wireless communication and corresponds to a group that executes voice communication based on the peer to peer wireless communication; and
a pairing processing unit configured to:
transmit, based on the group list information, a first pairing request to the second communication device;
execute, based on the transmitted first pairing request, a first pairing processing with the second communication device;
establish, based on the first pairing processing, a connection between the first communication device and the second communication device to set the first communication device as a wireless communication target of the second communication device and the second communication device as a wireless communication target of the first communication device; and
transmit, based on the established connection between the first communication device and the second communication device, a pairing execution instruction to the second communication device,
wherein the pairing execution instruction transmitted by the first communication device causes the second communication device to transmit a second pairing request to the third communication device and execute a second pairing processing with the third communication device to establish a connection between the second communication device and the third communication device.

2. The first communication device according to claim 1, wherein the list information processing unit is further configured to select the at least two communication devices of the plurality of communication devices based on a grouping start input operation.

3. The first communication device according to claim 2, wherein
the list information processing unit is further configured to generate the group list information that indicates device identification information of each of the selected at least two communication devices, and
the device identification information of the selected at least two communication devices is arranged in descending order of received signal strength indicators of the selected at least two communication devices.

4. The first communication device according to claim 2, wherein
a number of communication devices, including the first communication device, in the group list information is limited to an upper limit number.

5. The first communication device according to claim 1, wherein the pairing processing unit is further configured to execute a third pairing processing with the third communication device indicated in the group list information.

6. The first communication device according to claim 1, wherein the pairing processing unit is further configured to control transmission of the group list information to at least one communication device indicated in the group list information.

7. The first communication device according to claim 1, wherein
the pairing processing unit is further configured to control transmission of the first pairing request to the second communication device after start of a grouping process,
the second communication device transitions, based on the first pairing request, to a non-responding state for a third pairing request that specifies the second communication device, and
the first pairing request is different from the third pairing request.

8. The first communication device according to claim 1, wherein
the pairing processing unit is further configured to receive a pairing completion notification from the second communication device based on the pairing execution instruction and completion of the second pairing processing with the third communication device indicated in the group list information.

9. The first communication device according to claim 1, further comprising:
a voice input unit;
a voice output unit; and
a codec unit configured to:
encode and decode a voice signal; and
execute the voice communication.

10. The first communication device according to claim 1, wherein the pairing processing unit is further configured to:
control transmission of the group list information to the second communication device indicated in the group list information based on the established connection between the first communication device and the second communication device; and
control transmission of the group list information from the second communication device to the third communication device based on the established connection between the second communication device and the third communication device.

11. A communication device pairing method, comprising:
in a first communication device:
transmitting an ID packet to a plurality of communication devices;
receiving a plurality of responses from the plurality of communication devices based on the transmitted ID packet, wherein
each response of the plurality of responses includes device type information of a corresponding communication device of the plurality of communication devices, and
the device type information indicates a class of device (CoD) of the corresponding communication device;
selecting at least two communication devices of the plurality of communication devices based on the device type information, wherein the selected at least two communication devices include a second communication device and a third communication device;
generating group list information that indicates the first communication device and the selected at least two communication devices,
wherein each communication device indicated in the group list information executes a peer to peer wireless communication and corresponds to a group that executes voice communication based on the peer to peer wireless communication;
transmitting, based on the group list information, a first pairing request to the second communication device;
executing, based on the transmitted first pairing request, a first pairing processing with the second communication device;
establishing, based on the first pairing processing, a connection between the first communication device and the second communication device to set the first communication device as a wireless communication target of the second communication device and the second communication device as a wireless communication target of the first communication device; and
transmitting, based on the established connection between the first communication device and the second communication device, a pairing execution instruction to the second communication device,
wherein the pairing execution instruction transmitted by the first communication device causes the second communication device to transmit a second pairing request to the third communication device and execute a second pairing processing with the third communication device to establish a connection between the second communication device and the third communication device.

12. A non-transitory computer-readable medium, having stored thereon, computer-executable instructions, which when executed by a processor of a first communication device, cause the processor to execute operations, the operations comprising:
transmitting an ID packet to a plurality of communication devices;
receiving a plurality of responses from the plurality of communication devices based on the transmitted ID packet, wherein
each response of the plurality of responses includes device type information of a corresponding communication device of the plurality of communication devices, and
the device type information indicates a class of device (CoD) of the corresponding communication device;

selecting at least two communication devices of the plurality of communication devices based on the device type information, wherein the selected at least two communication devices include a second communication device and a third communication device;

generating group list information that indicates the first communication device and the selected at least two communication devices,
- wherein each communication device indicated in the group list information executes a peer to peer wireless communication and corresponds to a group that execute voice communication based on the peer to peer wireless communication;

transmitting, based on the group list information, a first pairing request to the second communication device;

executing, based on the transmitted first pairing request, a first pairing processing with the second communication device;

establishing, based on the first pairing processing, a connection between the first communication device and the second communication device to set the first communication device as a wireless communication target of the second communication device and the second communication device as a wireless communication target of the first communication device; and transmitting, based on the established connection between the first communication device and the second communication device, a pairing execution instruction to the second communication device, wherein the pairing execution instruction transmitted by the first communication device causes the second communication device to transmit a second pairing request to the third communication device and execute a second pairing processing with the third communication device to establish a connection between the second communication device and the third communication device.

13. A first communication device, comprising:

a list information processing unit configured to:
- transmit an ID packet to a plurality of communication devices;
- receive a plurality of responses from the plurality of communication devices based on the transmitted ID packet, wherein
  - each response of the plurality of responses includes device type information of a corresponding communication device of the plurality of communication devices, and
  - the device type information indicates a class of device (CoD) of the corresponding communication device;
- select a second communication device of the plurality of communication devices and a third communication device of the plurality of communication devices based on a grouping start input operation and the device type information, wherein
  - the second communication device and the third communication device correspond to a group that executes voice communication, and
  - the second communication device and the third communication device execute a peer to peer wireless communication; and
- generate group list information that indicates the first communication device, the second communication device, and the third communication device; and a pairing processing unit configured to:
- transmit, based on the group list information, a first pairing request to the second communication device;
- execute, based on the transmitted first pairing request, a first pairing processing with the second communication device;
- establish, based on the first pairing processing, a connection between the first communication device and the second communication device to set the first communication device as a wireless communication target of the second communication device and the second communication device as a wireless communication target of the first communication device;
- control, based on the established connection between the first communication device and the second communication device, transmission of the group list information to the second communication device indicated in the group list information; and
- transmit, based on the established connection between the first communication device and the second communication device, a pairing execution instruction to the second communication device, wherein the pairing execution instruction transmitted by the first communication device causes the second communication device to transmit a second pairing request to the third communication device and execute a second pairing processing with the third communication device to establish a connection between the second communication device and the third communication device.

* * * * *